US012560421B2

(12) United States Patent
Eisner

(10) Patent No.: US 12,560,421 B2
(45) Date of Patent: Feb. 24, 2026

(54) APPARATUS FOR THE INSPECTION OF A CIRCULAR ELONGATED ELEMENT

(71) Applicant: Schott AG, Mainz (DE)

(72) Inventor: Armin Eisner, Leonberg (DE)

(73) Assignee: Schott AG, Mainz (DE)

( * ) Notice: Subject to any disclaimer, the term of this patent is extended or adjusted under 35 U.S.C. 154(b) by 550 days.

(21) Appl. No.: 17/939,197

(22) Filed: Sep. 7, 2022

(65) Prior Publication Data

US 2023/0072907 A1     Mar. 9, 2023

(30) Foreign Application Priority Data

Sep. 7, 2021   (EP) ..................................... 21195186

(51) Int. Cl.
*G01B 11/10*        (2006.01)
*G01B 11/24*        (2006.01)
*G06T 7/00*         (2017.01)

(52) U.S. Cl.
CPC ........ *G01B 11/105* (2013.01); *G01B 11/2408* (2013.01); *G06T 7/001* (2013.01); *G06T 2207/30172* (2013.01)

(58) Field of Classification Search
CPC ... G01B 11/105; G01B 11/2408; G06T 7/001; G06T 2207/30172
USPC ....................................................... 385/115
See application file for complete search history.

(56) References Cited

U.S. PATENT DOCUMENTS

2011/0164873 A1* 7/2011 Hayashi ................. H04B 10/03
                                                    398/6
2016/0299170 A1* 10/2016 Ito .......................... G02B 23/26

FOREIGN PATENT DOCUMENTS

| | | |
|---|---|---|
| DE | 35 37 434 A1 | 4/1987 |
| DE | 10 2005 038 764 B3 | 10/2006 |
| DE | 10 2006 034 878 B3 | 11/2007 |
| EP | 20 153 400.5 | 1/2020 |
| EP | 20 195 758.6 | 9/2020 |
| EP | 3 848 701 A1 | 7/2021 |
| JP | 2021-92504 A | 6/2021 |

OTHER PUBLICATIONS

European Communication Pursuant to Article 94(3) EPC dated May 11, 2022 for European Patent Application No. 21 195 186.6 (7 pages).
"Pose Determination of Circular Cylinders Using Elliptical and Side Projections", Shiu et al., Proceedings of the International Conference on Systems Engineering, New York, IEEE, pp. 265-268, Aug. 1, 1991 (4 pages).

* cited by examiner

*Primary Examiner* — Jerry M Blevins
(74) *Attorney, Agent, or Firm* — TAYLOR & EDELSTEIN, PC

(57)                    ABSTRACT

A bundle includes five or more circular elongated elements. Each circular elongated element includes: a first end; a cylindrical portion defining an outer diameter of the circular elongated element and a rotation axis of the circular elongated element; and a second end. The first end and/or the second end of each circular elongated element fulfills at least one of the following equations: ARO≤A or ARO/OD≤B, where value A is 1.3 mm, ARO is an axial run out in mm of the first end and/or the second end of the respective circular elongated element, value B in mm/mm is 0.1, and OD is the outer diameter in mm of the respective circular elongated element.

19 Claims, 6 Drawing Sheets

APPARATUS FOR THE INSPECTION OF A CIRCULAR ELONGATED ELEMENT

CROSS REFERENCE TO RELATED APPLICATIONS

This application claims priority to European Patent Application No. 21195186.8 filed on Sep. 7, 2021, which is incorporated in its entirety herein by reference.

BACKGROUND OF THE INVENTION

1. Field of the Invention

The present invention related to circular elongated elements and methods for producing such elements.

2. Description of the Related Art

Circular elongated elements, like glass tubes, are commonly used to produce pharmaceutical packaging like vials, syringes, and cartridges. Therefore, the glass tubes are clamped in a machine and sequentially formed and cut, for example, as described in DE 10 2005 038 764 B3 and DE 10 2006 034 878 B3. Due to the harsh conditions during the transport and the further processing, it may occur that the glass tubes break, especially if the dimensional deviation of the glass tubes exceed a certain value. It has been recognized that the ends of glass tubes, especially the axial run out, has a strong influence on the stability and processability of the glass tubes and thus, there is demand to produce glass tubes having a small axial run out. The ends of the glass tubes are formed by heating the circumference at the cylindrical portion with a burner near the end of the glass tube and then cooling the heated portion immediately, so that the glass tube breaks at the heated portion. Thereafter, the end portion of the glass tube is annealed to form a smooth end of the glass tube. Even if the process is well known, the formed end of glass tube still deviates due to many factors. Thus, it is not possible to reliably form the end of the glass tube to obtain glass tubes having an end with consistent high quality. To obtain glass tubes having a small axial run out, it might be possible to quantify the axial run out of each end of the glass tube and sort out glass tubes being not in a predetermined range. A common method to measure the axial run out is a method wherein a dial indicator is pressed against the rotating glass tube while the glass tube is turned. However, this method has the drawback that the measuring apparatus is in direct contact with the glass tube and consequently, the end of the glass tube is damaged and particles due to abrasion are produced during the rotation. Further, methods to contactless inspect a transparent circular elongated element are known, which acquire images and compare the brightness of specific parts of the image with a reference to obtain information about the quality, e.g. as described in EP 20 195 758.6, EP 20 153 400.5 and JP 2 021 092 504 A. However, even if the methods described therein can reliably detect defects within the wall of the transparent element, these methods, especially since they have in common that they directly compare the brightness of specific parts of the image with a reference, are not suitable to quantify the axial run out of an end of a circular elongated element but rather can detect defects within the transparent element or strong deformations of the element. What is needed in the art is a method or system capable of one or more of:

determining and quantifying the axial run out of an end of an circular elongated element;

determining and quantifying the axial run out of transparent, colored and opaque circular elongated elements;

determining and quantifying the axial run out independent of the curvature of the circular elongated element;

quantifying the axial run out on a µm scale;

performing the measurement contactless;

producing circular elongated elements having an axial run out in a predetermined range; and determining and quantifying the axial run out independent of the inclination of the circular elongated element during the measurement.

What is also needed in the art is a way to provide a bundle of circular elongated elements:

having improved quality, i.e. wherein the axial run out is in a predetermined range and is reliably measured, e.g. on a µm range and/or independent of the curvature of the circular elongated element; and/or having decreased fracture susceptibility during transport and further processing; and/or having improved processability.

SUMMARY OF THE INVENTION

In some exemplary embodiments provided according to the invention, a bundle includes five or more circular elongated elements. Each circular elongated element includes: a first end; a cylindrical portion defining an outer diameter of the circular elongated element and a rotation axis of the circular elongated element; and a second end. The first end and/or the second end of each circular elongated element fulfills the following equation: $ARO \leq A$, where value A is 1.3 mm and ARO is an axial run out in mm of the first end and/or the second end of the respective circular elongated element.

In some exemplary embodiments provided according to the invention, a bundle includes five or more circular elongated elements. Each circular elongated element includes: a first end; a cylindrical portion defining an outer diameter of the circular elongated element and a rotation axis of the circular elongated element; and a second end. The first end and/or the second end of each circular elongated element fulfills the following equation: $ARO/OD \leq B$, where ARO is an axial run out in mm of the first end and/or the second end of the respective circular elongated element, value B in mm/mm is 0.1, and OD is the outer diameter in mm of the respective circular elongated element.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
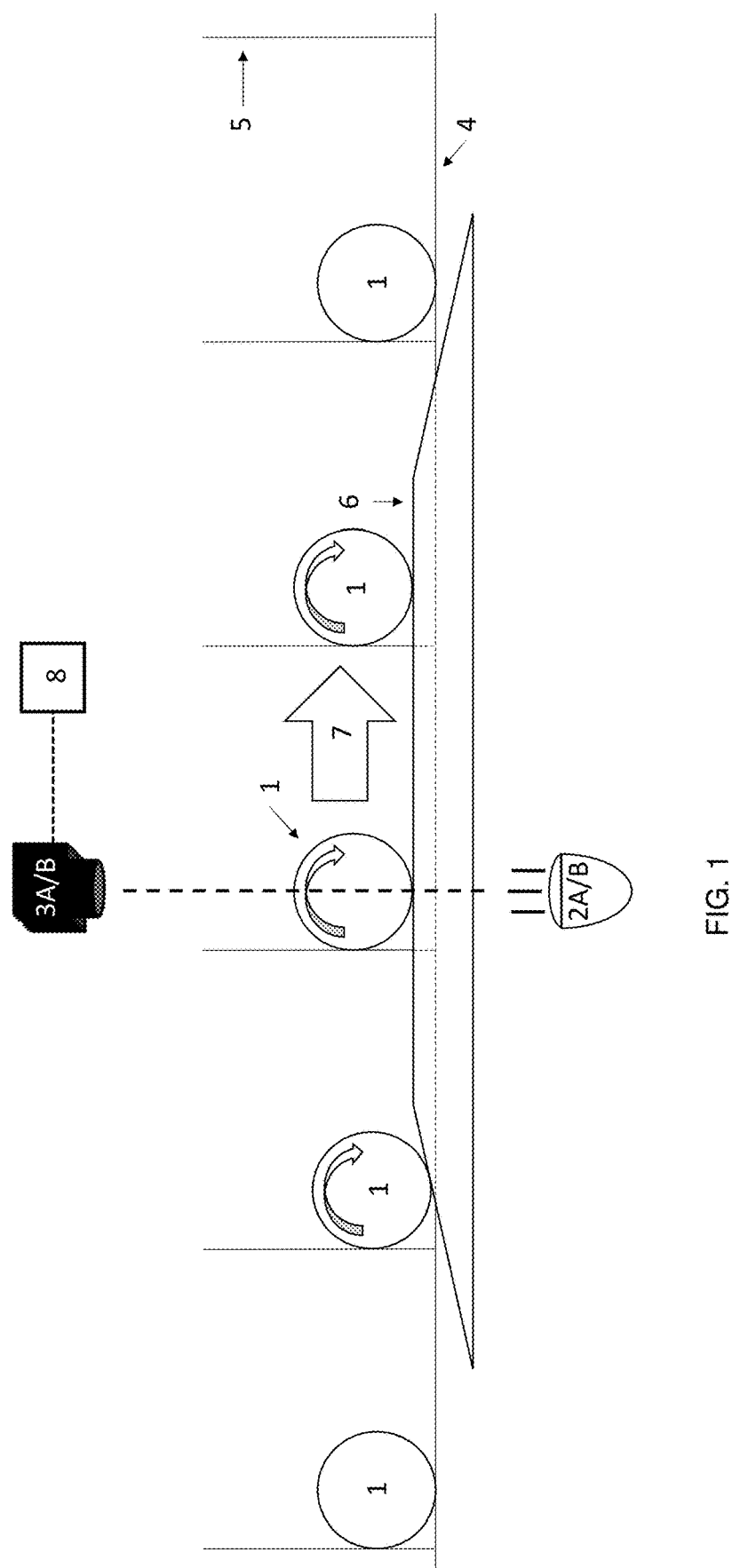
FIG. 1 a schematic side view of a system provided according to an embodiment.

Exemplary embodiments disclosed herein provide a method for determining the axial run out of a circular elongated element, comprising the steps:

> providing a circular elongated element by a providing unit, the circular elongated element comprising:
>> a first end,
>> a cylindrical portion, defining:
>>> an outer diameter OD of the circular elongated element, and
>>> a rotation axis R of the circular elongated element, and
>> a second end;
> illuminating the first end of the circular elongated element with a light source A of a light emitting unit;
> acquiring one or more image(s) of the first end of the circular elongated element with a camera A of a light receiving unit, wherein the angle $\alpha$ between the centerline of the camera A and a plane perpendicular to an rotation axis $R_{ideal}$ of an ideal circular elongated element is more than 0° and less than 90°;
> determining at least a part of the circumference of the first end of the circular elongated element in each of the one or more image(s) to obtain a determined at least a part of the circumference of the first end of the circular elongated element; and
> comparing the determined at least a part of the circumference of the first end of the circular elongated element with at least a part of an ellipse to determine the axial run out of the first end of the circular elongated element.

Some exemplary embodiments disclosed herein provide a system for determining the axial run out of a circular elongated element, comprising:

> a providing unit configured for providing a circular elongated element, the circular elongated element comprising:
>> a first end,
>> a cylindrical portion, defining:
>>> an outer diameter OD of the circular elongated element, and
>>> a rotation axis R of the circular elongated element, and
>> a second end;
> a light emitting unit comprising a light source A configured for illuminating the first end of the circular elongated element;
> a light receiving unit comprising a camera A configured for acquiring one or more image(s) of the first end of the circular elongated element, wherein the angle $\alpha$ between the centerline of the camera A and a plane perpendicular to an rotation axis $R_{ideal}$ of an ideal circular elongated element is more than 0° and less than 90°; and a computer unit configured for performing the following steps, optionally in this order:

>> determining at least a part of the circumference of the first end of the circular elongated element in each of the one or more image(s) to obtain a determined at least a part of the circumference of the first end of the circular elongated element; and
>> comparing the determined at least a part of the circumference of the first end of the circular elongated element with at least a part of an ellipse to determine the axial run out of the first end of the circular elongated element.

Especially by the determination of at least a part of the circumference of the first end of the circular elongated element in each of the one or more image(s) and subsequent comparison with at least a part of an ellipse, one or more of the above described objects are solved. In some embodiments, the centerline of the camera A crosses a line defined by the rotation axis $R_{ideal}$ of an ideal circular elongated element in at least one image. It has been recognized that it is essential for quantifying the axial run out to determine at least a part of the circumference of an end of the circular elongated element in the acquired image and then compare this at least part of the circumference with at least a part of an ellipse to quantify the axial run out. If the determination step is missing and the image itself is compared with a reference, e.g. an ellipse, the axial run out cannot be quantified.

In some embodiments, the method further comprises the steps, optionally in this order:

> illuminating the second end with a light source B of the light emitting unit; and
> acquiring one or more image(s) of the second end of the circular elongated element with a camera B of the light receiving unit, wherein the angle $\beta$ between the centerline of the camera B and a plane perpendicular to the rotation axis $R_{ideal}$ of an ideal circular elongated element is more than 0° and less than 90°;
> determining at least a part of the circumference of the second end of the circular elongated element in each of the one or more image(s) to obtain a determined at least a part of the circumference of the second end of the circular elongated element; and
> comparing the determined at least a part of the circumference of the second end of the circular elongated element with at least a part of an ellipse to determine the axial run out of the second end of the circular elongated element.

Thus, the axial run out of both ends of the circular elongated element can be determined and quantified. The determination of the axial run out of the first end and the second end can be performed simultaneously or sequentially. In some embodiments, the centerline of the camera B crosses a line defined by the rotation axis $R_{ideal}$ of an ideal circular elongated element in at least one image.

In some embodiments, the method further comprises the step:

> rotating the circular elongated element around the rotation axis R;
> wherein the one or more image(s) is/are acquired, while the circular elongated element is rotating around the rotation axis R. Thus, the entire circumference can be easily measured with only one/two camera(s) in case only a part of the circumference of the first and/or second end of the circular elongated element is determined and/or compared in each of the one or more image(s).

In some embodiments, the circular elongated element is moved relative to the light receiving unit; wherein the circular elongated element is rotated while the circular elongated element is moving relative to the light receiving unit; and wherein the one or more image(s) of the first and/or second end of the circular elongated element is/are acquired while the circular elongated element is moving relative to the light receiving unit and while the circular elongated element is rotating. Thus, the entire circumference can be easily measured with only one/two camera(s) in case only a part of the circumference of the first and/or second end of the circular elongated element is determined and/or compared in each of the one or more image(s).

In some embodiments, the method further comprises the step:

determining the angle $\vartheta$ between the rotation axis R of the circular elongated element and the rotation axis $R_{ideal}$ of an ideal circular elongated element; and wherein the at least a part of an ellipse is corrected based on the angle $\vartheta$ before the comparison, optionally as described in the description. Thus, at least a part of a corrected ellipse can be obtained, and the quality of the measurement is further improved and a measurement on a µm scale can be more reliably conducted.

In some embodiments or aspect of the invention, the method further comprises the step:

producing a pharmaceutical packaging, optionally a vial, cartridge, syringe or ampule, from the circular elongated element obtainable, obtained and/or measured by the method described herein.

According to the invention, a system for determining the axial run out of a circular elongated element is provided, comprising:

a providing unit configured for providing a circular elongated element, the circular elongated element comprising:

a first end, a cylindrical portion, defining:

an outer diameter OD of the circular elongated element, and a rotation axis R of the circular elongated element, and a second end;

a light emitting unit comprising a light source A configured for illuminating the first end of the circular elongated element;

a light receiving unit comprising a camera A configured for acquiring one or more image(s) of the first end of the circular elongated element, wherein the angle $\alpha$ between the centerline of the camera A and a plane perpendicular to a rotation axis $R_{ideal}$ of an ideal circular elongated element is more than 0° and less than 90°; and a computer unit configured for performing the following steps, optionally in this order:

determining at least a part of the circumference of the first end of the circular elongated element in each of the one or more image(s) to obtain a determined at least a part of the circumference of the first end of the circular elongated element; and comparing the determined at least a part of the circumference of the first end of the circular elongated element with at least a part of an ellipse to determine the axial run out of the first end of the circular elongated element.

In some embodiments, the light emitting unit comprises a light source B configured for illuminating the second end of the circular elongated element; wherein the light receiving unit comprises a camera B configured for acquiring one or more image(s) of the second end of the circular elongated element, wherein the angle $\beta$ between the centerline of the camera B and a plane perpendicular to the rotation axis $R_{ideal}$ of an ideal circular elongated element is more than 0° and less than 90°; and wherein the computer unit is configured for performing the following further steps, optionally in this order:

determining at least a part of the circumference of the second end of the circular elongated element in each of the one or more image(s) to obtain a determined at least a part of the circumference of the second end of the circular elongated element; and comparing the determined at least a part of the circumference of the second end of the circular elongated element with at least a part of an ellipse to determine the axial run out of the second end of the circular elongated element.

Thus, the axial run out of both ends of the circular elongated element can be determined and quantified. The determination of the axial run out of the first end and the second end can be performed simultaneously or sequentially.

In some embodiments, the system further comprises:

a rotation device for rotating the circular elongated element around the rotation axis R; wherein the one or more image(s) is/are acquired, while the circular elongated element is rotating around the rotation axis R. Thus, the entire circumference can be easily measured with only one/two camera(s) in case only a part of the circumference of the first and/or second end of the circular elongated element is determined and/or compared in each of the one or more image(s).

In some embodiments, the computer unit is configured for performing the further step:

determining the angle $\vartheta$ between the rotation axis R of the circular elongated element and the rotation axis $R_{ideal}$ of an ideal circular elongated element; and wherein the at least a part of an ellipse is corrected based on the angle $\vartheta$ before the comparison, optionally as described in the description. Thus, a corrected at least a part of the ellipse can be obtained, and the quality of the measurement is further improved and a measurement on a µm scale can be more reliably conducted.

The at least a part of the circumference of the first and/or second end of the circular elongated element is not particularly limited. Optionally, it is 1% or more, optionally 1% to 100%, optionally 1% to 95%, optionally 10% to 90%, optionally 20 to 80%, optionally 30 to 50%, of the entire circumference [mm/mm]. Optionally, the at least a part of the circumference of the first end, optionally and the second end, of the circular elongated element comprises, optionally is, the part of the circumference of the first and/or second end of the circular elongated element facing away from the camera A, optionally and B, when acquiring the image. It has been recognized that surprisingly if the part of the circumference of the first and/or second end of the circular elongated element facing away from the camera when acquiring the image is used for the determination and/or, optionally and, comparison, the accuracy of the measurement can be significantly improved, since the contour can be determined more precisely, especially if the circular elongated element is made of glass and the end(s) is/are formed by annealing forming the end(s). Especially, if the at least a part of the circumference of the first and/or second end of the circular elongated element comprises, optionally is, the part of the circumference of the first and/or second end of the circular elongated element facing away from the camera when acquiring the one or more image and the one or more image(s) of the first and/or second end of the circular elongated element is/are acquired while the circular elongated element is rotated around the rotation axis R, the accuracy of the measurement of the axial run out can be significantly improved. In addition, by this method not only transparent, but also colored and opaque elements can be measured, which is not possible if the entire circumference is used, since at the specific angle of the camera with regard to the circular elongated element, the contour of the part of the circumference of the first and/or second end of the circular elongated element facing towards the camera when acquiring the image cannot be determined precisely.

The ellipse is not particularly limited. In some embodiments, the at least a part of an ellipse is at least a part of an half ellipse, optionally at least a part of an ideal half ellipse and/or at least a part of a corrected half ellipse, optionally at least a part of a corrected half ellipse, optionally 20 to 98% of a corrected half ellipse, optionally 50 to 95% of a corrected half ellipse, optionally 70 to 93% of a corrected half ellipse, optionally about 90% of a corrected half ellipse [mm/mm]; and optionally wherein the half ellipse, the ideal half ellipse and/or the corrected half ellipse is/are obtainable as described in the description. Optionally, the part of the ellipse is the part corresponding to the part of the circumference of the first and/or second end of the circular elongated element. However, it might be also beneficial to determine the entire circumference but compare only a part of the determined circumference with a part of the ellipse. Especially, if the at least a part of an ellipse is at least a part of a corrected half ellipse, optionally at least a part of a corrected half ellipse, optionally 20 to 98% of a corrected half ellipse, optionally 50 to 95% of a corrected half ellipse, optionally 70 to 93% of a corrected half ellipse, optionally about 90% of a corrected half ellipse [mm/mm], the accuracy of the measurement can be significantly improved. Herein, X % of the half ellipse is (X/2)% of the entire circumference of the ellipse [mm/mm]. Optionally, the part of the ellipse is symmetrically identical with regard to a plane defined by the rotation axis of the circular elongated element and the respective camera, e.g. camera(s) A and/or B, optionally the centerline of the respective camera.

The position(s) of camera A and/or camera B is/are not particularly limited. Optionally, the camera A, optionally and B, optionally all cameras of the light receiving unit, is/are outside an area in-between a first plane and a second plane, wherein the first plane is a plane perpendicular to the rotation axis $R_{ideal}$ of an ideal circular elongated element and positioned at the first end of the ideal circular elongated element and the second plane is a plane perpendicular to the rotation axis $R_{ideal}$ of an ideal circular elongated element and positioned at the second end of the ideal circular elongated element; and/or the camera A, optionally and B, optionally all cameras of the light receiving unit, is/are positioned that the camera A; optionally and B, respectively; optionally all cameras of the light receiving unit, receive light from the entire circumference of the first; optionally and the second end, respectively; of the circular elongated element which has not passed through any part of the circular elongated element; and/or
   the angle ΔXYZ for camera A, optionally and B, optionally all cameras of the light receiving unit, is more than 90°, wherein Y is the end of the circular elongated element facing to the respective camera acquiring an image of the respective end and X is the opposite end of the circular elongated element and Z is the respective camera acquiring the image. If the camera(s) is/are at this/these specific position(s), the accuracy of the measurement can be significantly improved and a measurement of the axial run out can be reliably determined on a μm range. In addition, by this method not only transparent, but also colored and opaque elements can be measured. If the camera(s) is/are inside an area in-between a first plane and a second plane, wherein the first plane is a plane perpendicular to the rotation axis $R_{ideal}$ of an ideal circular elongated element and positioned at the first end of an ideal circular elongated element and the second plane is a plane perpendicular to the rotation axis $R_{ideal}$ of an ideal circular elongated element and positioned at the second end of an ideal circular elongated element, the cameras receive also reflected light.

Especially, if the at least a part of the circumference of the first and/or second end of the circular elongated element comprises, optionally is, the part of the circumference of the first and/or second end of the circular elongated element facing away from the camera when acquiring the one or more image(s); and the one or more image(s) of the first and/or second end of the circular elongated element is/are acquired while the circular elongated element is rotated around the rotation axis R; and wherein the camera A, optionally and B, optionally all cameras of the light receiving unit, is/are outside an area in-between a first plane and a second plane, wherein the first plane is a plane perpendicular to the rotation axis $R_{ideal}$ of an ideal circular elongated element and positioned at the first end of the ideal circular elongated element and the second plane is a plane perpendicular to the rotation axis $R_{ideal}$ of an ideal circular elongated element and positioned at the second end of the ideal circular elongated element, the accuracy of the measurement of the axial run out can be significantly improved.

According to the invention, the angle α, optionally and β, between the centerline of the camera A, optionally and B, and a plane perpendicular to the rotation axis $R_{ideal}$ of an ideal circular elongated element is more than 0° and less than 90°. If the angle is 0°, it might be possible that some parts of the circumference of the end of the circular elongated element are hidden during the measurement, and thus, the axial run out cannot be determined if the angle is 0°. Similar, if the angle is 90°, the axial run out extends exactly towards the camera and thus, the axial run out cannot be determined if the angle is 90°. In some embodiments, α, optionally and β, is/are 1° or more, optionally 2° or more, optionally 3° or more, optionally 4° or more, optionally 5° or more, optionally 8° or more, optionally 15° or more, optionally 25° or more, optionally 35° or more, optionally 45° or more. The bigger the angle, the larger the axial run out which can be measured with the method and/or system can be. If the angle is close to 0°, only circular elongated elements having a very small axial run out can be measured. In some embodiments, α, optionally and β, is/are 89° or less, optionally 45° or less, optionally 35° or less, optionally 25° or less, optionally 15° or less, optionally 10° or less, optionally 8° or less, optionally 7° or less, optionally 6° or less, optionally 5° or less, optionally 4° or less, optionally 3° or less, optionally 2° or less. The smaller the angle, the more accurate the contour of the circumference of the end of the circular elongated element can be determined. It has been recognized that surprisingly if the angle is 2° or more and 45° or less, optionally 3° or more and 25° or less, optionally 4° or more and 15° or less, optionally about 5°, the accuracy and reliability of the measurement can be significantly improved and it is possible to reliably determine the axial run out of the entire circumference on a μm range, especially if the circular elongated element is made of glass and the end(s) is/are formed by annealing and forming the end(s).

In some embodiments, $\alpha$ is $\beta \pm 10°$, optionally is $\beta \pm 5°$, optionally wherein $\alpha$ and $\beta$ are the same. Thus, it is easier to determine the circumferences of both ends simultaneously and thus, the method and system is more efficient and faster.

The position and orientation of the light source is not particularly limited. Optionally, the light source A, optionally and light source B, define(s), optionally is/are, a light emitting plane A, optionally and a light emitting plane B; wherein the angle $\lambda$ between the centerline of camera A; optionally and B, respectively; and a plane defined by the light emitting plane A; optionally and B, respectively; is 5° or more and 90° or less, optionally 45° or more and 90° or less, optionally 55° or more and 90° or less, optionally 65° or more and 90° or less, optionally 75° or more and 90° or less, optionally 85° or more and 90° or less. Thus, especially the contour of the part of the circumference of the first and/or second end of the circular elongated element facing away from the camera when acquiring the image can be precisely determined.

In some embodiments, a lens, optionally a cylindrical lens, optionally a convex cylindrical lens, is positioned between the light source A and the circular elongated element; and/or a lens, optionally a cylindrical lens, optionally a convex cylindrical lens, is positioned between the light source B and the circular elongated element; and/or the light that leaves the circular elongated element is at least partially collimated light, divergent light or convergent light, optionally at least collimated light; and/or the light that reaches the circular elongated element is at least partially collimated light, divergent light or convergent light, optionally at least partially convergent light. Thus, the quality and reliability of the measurement can be improved.

In some embodiments, the light source A, optionally and B, optionally all light sources of the light emitting unit, is/are inside an area in-between a first plane and a second plane, wherein the first plane is a plane perpendicular to the rotation axis $R_{ideal}$ of an ideal circular elongated element and positioned at the first end of the ideal circular elongated element and the second plane is a plane perpendicular to the rotation axis $R_{ideal}$ of an ideal circular elongated element and positioned at the second end of the ideal circular elongated element; and/or the angle $\Delta MNO$ for light source A, optionally and B, optionally all light sources of the light emitting unit, is less than 90°, wherein N is the end of the circular elongated element facing to the respective light source illuminating the respective end and M is the opposite end of the circular elongated element and O is the respective light source. Thus, the illumination can be further improved and thus the quality and reliability of the measurement can be further improved.

The number of images acquired of each end of the circular elongated element is not particularly limited. Optionally, at least 3, optionally at least 5, optionally at least 10, optionally at least 20, optionally at least 30 images of the first end, optionally and the second end, of the circular elongated element are acquired, optionally wherein sufficient images, optionally at least 3, optionally at least 5, optionally at least 10, optionally at least 20, optionally at least 30 images, are acquired by camera A; optionally and camera B, so that the parts of the circumference(s) of the first end, optionally and the second end, of the circular elongated element, facing away from the camera A; optionally and camera B, respectively; can be put together to obtain the entire circumference(s) of the first end, optionally and the second end, of the circular elongated element; optionally to determine the (entire) axial run out(s) of the first end, optionally and the second end, of the circular elongated element, optionally based on the parts of the circumference(s). Thus, the reliability of the measurement can be improved.

The amount of pixels and the distance of the camera(s) are not particularly limited. Optionally, the camera(s) A and/or B has 0.1 megapixel or more, optionally 0.2 megapixel or more, optionally 0.5 or more, optionally 1.0 megapixel or more, optionally 2 megapixel or more; and/or 500 megapixel or less, optionally 100 megapixel or less, optionally 10 megapixel or less, optionally 5 megapixel or less; and/or the distance between the camera A and the camera B, respectively, and the first end of the circular elongated element and the second end of the circular elongated element, respectively, is 1 cm or more and 3000 cm or less, optionally 10 cm to 100 cm. Thus, the accuracy of the measurement can be improved.

In some embodiments, the first and the second end of the circular elongated element are measured simultaneously or sequentially, optionally simultaneously. Especially, if the ends are measured simultaneously, the time of measurement can be significantly shortened.

The time of the measurement is not particularly limited. Optionally, the time to measure the axial run out of the first end, optionally and the second end, of the circular elongated element is 1 minute or less, optionally 30 seconds or less, optionally 15 seconds or less, optionally 12 seconds or less, optionally 10 seconds or less, optionally 8 seconds or less, optionally 6 seconds or less, optionally 5 seconds or less, optionally 4 seconds or less, optionally 3 seconds or less, optionally 2 seconds or less, optionally 1 seconds or less, optionally 0.5 seconds or less; optionally 0.3 seconds or less. An advantage is that the measurement of the axial run out is very fast, very accurate and reliable. Especially, if the circular elongated elements are rotated with a system as described in EP 3 848 701, which is incorporated herein by reference, it has been recognized that the axial run out can be measured with a very short time, i.e. in 5 seconds or less, optionally 4 seconds or less, optionally 3 seconds or less, optionally 2 seconds or less, optionally 1 seconds or less, optionally 0.5 seconds or less; optionally 0.3 seconds or less.

In some embodiments, the rotation axis $R_{ideal}$ of an ideal circular elongated element is determined by the providing unit and an ideal circular elongated element, wherein the ideal circular elongated element is an circular elongated element having no curvature and no ovality, optionally wherein the outer diameter and length of the circular elongated element and the ideal circular elongated element are the same.

In some embodiments, the providing unit comprises: i) a transport device, optionally comprising a transport plane and a feed plane, and ii) a rotation device, optionally comprising a rotation plane, optionally wherein the rotation plane and/or, optionally and, the transport plane is/are even; and/or optionally wherein the rotation plane is parallel to the transport plane, wherein the transport device is configured for moving the circular elongated element relative to the light receiving unit; wherein the rotation device and the transport device are configured for rotating the circular elongated element while the circular elongated element is moving relative to the light receiving unit; and wherein the light receiving unit is configured for acquiring one or more image(s) of the first and/or second end of the circular elongated element while the circular elongated element is moving relative to the light receiving unit and while the circular elongated element is rotating. Thus, the quality of the measurement can be further improved because the movement and rotation is very stable during the measurement. In addition the speed of the measuring system can be improved. In some embodiments, the providing unit, especially the transport device, transport plane, feed plane, rotation device and rotation plane, is/are as described in detail in EP 3 848 701 A1, which is incorporated herein by reference.

Another aspect of the invention is to provide a bundle comprising 5 or more circular elongated elements,
  each circular elongated element comprising:
    a first end,
    a cylindrical portion, defining:
      an outer diameter OD of the circular elongated element, and
      a rotation axis R of the circular elongated element, and
    a second end;
    wherein the first and/or, optionally and, the second end of each circular elongated element fulfill(s) the following equation:

$$ARO \leq A$$

wherein value A is 1.3 mm;
wherein ARO is/are the axial run out(s) in mm of the first end and/or second end of the circular elongated element.

Another aspect of the invention is to provide a bundle comprising 5 or more circular elongated elements,
  each circular elongated element comprising:
    a first end,
    a cylindrical portion, defining:
      an outer diameter OD of the circular elongated element, and
      a rotation axis R of the circular elongated element, and
    a second end;
    wherein the first and/or, optionally and, the second end of each circular elongated elements fulfill(s) the following equation:

$$ARO/OD \leq B$$

wherein value B [mm/mm] is 0.1;
wherein ARO is/are the axial run out(s) in mm of the first end and/or second end of the circular elongated element, and
wherein OD is the outer diameter in mm of the circular elongated element.

If each circular elongated element fulfills one or both of the above described parameter(s) ($ARO \leq A$ and/or $ARO/OD \leq B$), the quality of the bundle is improved, the fracture susceptibility during transport and further processing is decreased and the processability is improved.

The lower limit of the above described parameter(s) (ARO and/or ARO/OD) is not particularly limited. However, there is a point where the costs exceed the benefit. Thus, optionally, the first and/or, optionally and, the second end of each circular elongated element fulfill(s) the following equation(s):

$$C \leq ARO; \text{ and/or}$$

$$D \leq ARO/OD$$

wherein value C is 1 μm, optionally 10 μm, optionally 500 μm, optionally 1000 μm; and/or wherein value D [mm/mm] is $1*10^{-3}$, optionally $5*10^{-3}$, optionally $1*10^{-2}$, optionally $5*10^{-3}$;
wherein ARO is/are the axial run out(s) in mm of the first end and/or second end of the circular elongated element, and
wherein OD is the outer diameter in mm of the circular elongated element.

In some embodiments, A is 1.2 mm, optionally 1.1 mm, optionally 1.0 mm, optionally 0.9 mm, optionally 0.8 mm, optionally 0.7 mm, optionally 0.6 mm, optionally 0.5 mm, optionally 0.4 mm, optionally 0.35 mm, optionally 0.3 mm, optionally 0.25 mm, optionally 0.2 mm, optionally 0.15 mm, optionally 0.1 mm, optionally 0.05 mm, optionally 0.03 mm, optionally 0.01 mm. Thus, the quality of the bundle is further improved, the fracture susceptibility during transport and further processing is further decreased and the processability is further improved. It has been recognized that especially if A is 0.7 mm, optionally 0.6 mm, optionally 0.5 mm, optionally 0.4 mm, optionally 0.35 mm, optionally 0.3 mm, optionally 0.25 mm, optionally 0.2 mm, optionally 0.15 mm, optionally 0.1 mm, optionally 0.05 mm, optionally 0.03 mm, optionally 0.01 mm, the quality of the bundle is significantly improved, and the stability of the circular elongated elements in the bundle is further improved.

In some embodiments, B is 0.09, optionally 0.08, optionally 0.07, optionally 0.06, optionally 0.05, optionally 0.04, optionally 0.035, optionally 0.03, optionally 0.025, optionally 0.02, optionally 0.015, optionally 0.01, optionally 0.005, optionally 0.003, optionally 0.001. Thus, the quality of the bundle is further improved, the fracture susceptibility during transport and further processing is further decreased and the processability is further improved. It has been recognized that especially if B is 0.06, optionally 0.05, optionally 0.04, optionally 0.035, optionally 0.03, optionally 0.025, optionally 0.02, optionally 0.015, optionally 0.01, optionally 0.005, optionally 0.003, optionally 0.001, the quality of the circular elongated elements is significantly improved, and the stability of the circular elongated elements in the bundle is further improved, especially if the circular elongated elements have very small or very large outer diameters.

In some embodiments, the first end is an open end or closed end, optionally an open end; and/or the second end is an open end or closed end, optionally an open end. With the above described method or system it is possible to quantify the axial run out of open and closed ends of circular elongated elements. Optionally, both ends or open; or one end is open and one end is closed, e.g. the circular elongated element is a one-side-closed tube or vial.

In some embodiments, the value(s) A, B, C and/or D was/were determined contactless; and/or
  the value(s) A, B, C and/or D was/were obtainable and/or obtained by the method described herein and/or by using the system described herein; and/or the measurement of the value(s) A, B, C and/or D was/were performed contactless, i.e. that the end(s) of the circular elongated element(s) was/were not in contact with any material (except gas/air) during the measurement of the values A, B, C and/or D; and/or during the measurements of the value(s) A, B, C and/or D, there was no contact between the end(s) and/or end portion(s) of the circular elongated element(s) and any material, except gas and/or air; and/or during the measurement of the value(s) A, B, C and/or D at least the terminal 1 mm portion(s) of the circular elongated element(s) was/were surrounded by air; and/or during the measurement of the value(s) A, B, C and/or D, there was no contact between any unit involved in the measurement and the first and/or second end portion(s) of the circular elongated element(s). With the herein described method and system, it is possible to quantify the axial run out of a circular elongated element while the end of the circular elongated element is not in contact with any material, i.e. the end is surrounded by air during the measurement. The main advantage of the herein described method and/or system is, that a bundle of circular elongated elements can be provided having an axial run out being below a specific value and in addition, the axial run out was quantified without contacting the end(s) with any material. By any contact of the end(s) with a material, the end(s) of the circular elongated element may be damaged, i.e. cracks or formed, the surface is scratched or particles due to abrasion are formed. Thus, if the herein described method and/or system is used to determine the axial run out ARO, the quality of the bundle can be further improved.

Another aspect of the invention is the use of at least one circular elongated element of a bundle of any one of the preceding claims for the production of a pharmaceutical packaging, optionally wherein the pharmaceutical packaging is selected from the group consisting of vial, cartridge, syringe or ampule; and/or optionally wherein the circular elongated element is a glass tube. If a circular elongated element of the herein described bundle is used, optionally wherein the circular elongated element is a tube, optionally a glass tube, breakage during the production can be significantly reduced and less particles generated during the breakage contaminate the produced pharmaceutical packagings. Thus, the quality of the produced pharmaceutical packagings can be improved.

The shape of the circular elongated element is not particularly limited. It might be, for example, a tube, rod, pharmaceutical packaging, e.g. vial, cartridge, syringe or ampule. Optionally, the circular elongated element is a tube or rod, optionally a tube. Especially, if the circular elongated element is a tube or rod, optionally a tube, in a bundle thereof, the tubes or rods are in direct contact to each other, and thus, stable end portions of the tubes, e.g. having an axial run out being below a specific value, are very important.

In some embodiments, the bundle comprises, optionally exhibits, 5 or more, optionally 10 or more, optionally 20 or more, optionally 25 or more, optionally 35 or more, optionally 50 or more, optionally 60 or more, optionally 80 or more, optionally 100 or more, optionally 200 or more, circular elongated elements; and/or, optionally and; 1000 or less, optionally 800 or less, optionally 700 or less, optionally 600 or less, optionally 500 or less, optionally 400 or less, optionally 300 or less, optionally 200 or less, optionally 150 or less, optionally 100 or less, optionally 60 or less, circular elongated elements. For example, a bundle comprising 50 or more and 500 or less, optionally 100 or more and 300 or less circular elongated elements is provided.

In some embodiments, the circular elongated element is made of glass, optionally wherein the glass is a borosilicate glass, an aluminosilicate glass, a lithium-aluminosilicate (LAS) glass, optionally a borosilicate glass. Especially, if the circular elongated element is made of glass, it is very important to minimize the contact of the end portion due to the brittleness of glass. In addition, especially if the circular elongated element is glass, it is not possible to sufficiently control the end forming portion of the circular elongated element so that reliably the axial run out is below a specific value as descried herein and, due to the method or system described herein, the quality of the circular elongated elements can be significantly improved.

In some embodiments, the circular elongated element is made of glass, wherein the composition of the glass comprises, in mass-%:

Si: 30 to 98%, optionally 50 to 90%, optionally 70.0 to 74.0%; and/or $B_2O_3$: 0 to 30%, optionally 3 to 20%, optionally 7.0 to 16.0%; and/or $Al_2O_3$: 0 to 30%, optionally 1 to 15%, optionally 3.0 to 6.5%; and/or $X_2O$: 0 to 30%, optionally 1 to 15%, optionally 2.0 to 7.2%, wherein X is selected from Na, K, Li, optionally X is Na and/or K; and/or YO: 0 to 30%, optionally 0.1 to 5%, optionally 0.5 to 1.0%, wherein Y is selected from Ca, Mg, Ba, optionally Y is Ca and/or Mg.

In some embodiments, the circular elongated element is made of glass, wherein the composition of the glass consist of, in mass-%:

Si: 30 to 98%, optionally 50 to 90%, optionally 70.0 to 74.0%;

$B_2O_3$: 0 to 30%, optionally 3 to 20%, optionally 7.0 to 16.0%;

$Al_2O_3$: 0 to 30%, optionally 1 to 15%, optionally 3.0 to 6.5%;

$X_2O$: 0 to 30%, optionally 1 to 15%, optionally 2.0 to 7.2%, wherein X is selected from Na, K, Li, optionally X is Na and/or K;

YO: 0 to 30%, optionally 0.1 to 5%, optionally 0.5 to 1.0%, wherein Y is selected from Ca, Mg, Ba, optionally Y is Ca and/or Mg; and unavoidable impurities.

In some embodiments, the circular elongated element is made of glass, wherein the composition of the glass comprises, in mass-%:

Si: 20 to 98%, optionally 40 to 75%, optionally 50 to 65%; and/or $B_2O_3$: 0 to 30%, optionally 1 to 15%, optionally 3 to 9%; and/or $Al_2O_3$: 0 to 30%, optionally 10 to 20%, optionally 13 to 18; and/or $X_2O$: 0 to 30%, optionally 0 to 5%, optionally 0 to 3%, wherein X is selected from Na, K, Li, optionally X is Na and/or K; and/or YO: 0 to 50%, optionally 0.1 to 40%, optionally 10 to 35, wherein Y is selected from Ca, Mg, Ba, optionally Y is Ca and/or Mg.

In some embodiments, the circular elongated element is made of glass, wherein the composition of the glass consist of, in mass-%:

Si: 20 to 98%, optionally 40 to 75%, optionally 50 to 65%;

$B_2O_3$: 0 to 30%, optionally 1 to 15%, optionally 3 to 9%;

$Al_2O_3$: 0 to 30%, optionally 10 to 20%, optionally 13 to 18;

$X_2O$: 0 to 30%, optionally 0 to 5%, optionally 0 to 3%, wherein X is selected from Na, K, Li, optionally X is Na and/or K;

YO: 0 to 50%, optionally 0.1 to 40%, optionally 10 to 35, wherein Y is selected from Ca, Mg, Ba, optionally Y is Ca and/or Mg; and unavoidable impurities.

In some embodiments, the outer diameter OD, optionally measured at the center of the cylindrical portion of the circular elongated element, is 2 mm or more and 100 mm or less, optionally 4 mm or more and 50 mm or less, optionally 6 mm or more and 35 mm or less, optionally 8 mm or more and 25 mm or less, optionally 10 mm or more and 20 mm or less. Thus, the reliability of the measurement of the axial run can be improved and thus the quality of the bundle can be improved.

In some embodiments, the length of the cylindrical portion is 1 cm or more and 1000 cm or less, optionally 20 cm or more and 400 cm or less, optionally 60 cm or more and 300 cm or less, optionally 100 cm or more and 200 cm or less, optionally 120 cm or more and 180 cm or less.

In some embodiments, the circular elongated element is obtainable by the following steps:

forming a continuous circular elongated element by the Danner or the Vello process, cutting the continuous circular elongated element to length to obtain a cut circular elongated element, comprising a first end, a cylindrical portion and a second end; and forming the first and/or second end by:

annealing a ring-shaped area, optionally having a height of 2 mm or less, optionally 0.4 mm to 1.5 mm, near the first and/or second end of the cut circular elongated element, optionally with a burner, scratching at least a part of the ring-shaped area(s) to induce a crack, suddenly cooling the ring-shaped area(s), optionally with water, to obtain a clean cut circular elongated element, comprising a first end, a cylindrical portion and a second end, reheating and forming the first and/or second end of the clean cut circular elongated element to obtain the circular elongated element having an open first and/or second end;

and/or annealing a ring-shaped area near the first and/or second end of the cut circular elongated element above Tg, optionally with a burner, turning off and forming the first and/or second end of the cut circular elongated element, optionally and shaping the first and/or second end of the cut circular elongated element by an air stream, to obtain the circular elongated element having a closed first and/or second end.

Especially, if the circular elongated element is obtainable/obtained by a process comprising the Danner or Vello process, it is very important to minimize the contact of the end portion(s) of the obtained circular elongated elements made of glass due to the brittleness of glass. In addition, especially if the circular elongated element is obtainable/obtained by the above steps, it is not possible to sufficiently control the ends of the circular elongated element so that the axial run out is reliably and consistently below a specific value as descried herein and, due to the method or system described herein, the quality of a bundle comprising circular elongated elements can be significantly improved.

In some embodiments, the cylindrical elongated element comprises:

a first end comprising a/the circumference of the first end, and optionally a second end comprising a/the circumference of the second end, and a cylindrical portion, comprising:

a first end portion comprising the first end, and a center of the cylindrical portion; and optionally a second end portion comprising the second end, and optionally wherein the outer diameter OD is defined by the center of the cylindrical portion;

and/or, optionally and, optionally wherein the length(s) of the first end portion, optionally and the second end portion, is/are 0 cm to 10 cm, optionally 1 to 5 cm, optionally 5 cm; and/or wherein the length of the first and/or second end portion is 0% to 50%, optionally 0 to 30%, optionally about 2.5% of the length of the cylindrical portion [mm/mm] of the circular elongated element, optionally wherein the length(s) of the first end portion, optionally and the second end portion is about 2.5% of the length of the cylindrical portion [mm/mm] of the circular elongated element; and/or, optionally and, optionally wherein the first end portion defines the rotation axis R of the rotation axis R of the circular elongated element for the measurement of the axial run out of the first end; and/or, optionally and, optionally wherein the second end portion defines the rotation axis R of the rotation axis R of the circular elongated element for the measurement of the axial run out of the second end. Optionally or additionally, the circular elongated element may have narrowed portion, e.g. a neck or extended portion, e.g. a flange.

According to a further aspect of the invention, a pharmaceutical packaging is provided, producible from one or more circular elongated element of the bundle described herein, optionally wherein the pharmaceutical packaging is selected form the group consisting of vial, cartridge, syringe or ampule; and/or optionally wherein the circular elongated element is a glass tube. Due to the improved processability, less breakage during the production of the pharmaceutical packagings occur and consequently, less particles are formed during the production of the pharmaceutical packagings occur. Thus, the quality of the pharmaceutical packagings is increased.

Herein, all exemplary embodiments of the method also apply for the system, the bundle and the use described herein and vice versa. The combination of two or more, for example 2, 3, 4 or 5 exemplary embodiment is also provided.

If not stated otherwise, the angles $\alpha$ and $\beta$ are determined using the rotation axis $R_{ideal}$ of an ideal circular elongated element, i.e. a circular elongated element having no ovality and no curvature. The rotation axis can be determined by the providing unit and an ideal circular elongated element, i.e. a circular elongated element having no curvature and ovality. In other words, it is the rotation axis $R_{ideal}$ of an ideal circular elongated element being in contact with the providing unit at the position where the camera(s) acquire the image(s). A person skilled in the art has no difficulties to determine the rotation axis $R_{ideal}$ of an ideal circular elongated element by the providing unit and an ideal circular elongated element, which can be, for example, simulated by an laser beam.

To determine the angle $\vartheta$ the respective end portion of the circular elongated element is used to determine the rotation axis R of the circular elongated element in each image. As a consequence, the rotation axis of the circular elongated element may differ between two images and/or the first and second end of the circular elongated element. To determine the rotation axis R of the circular elongated element in each image, for example, two points on each side of the contour of the end portion of the circular elongated element are determined in an image. By these two points a line is defined for each side of the contour and the average of the two lines is the orientation of the rotation axis R of the circular elongated element. The angle $\vartheta$ is the angle determined in an image acquired by a camera of the light receiving unit, i.e.

a two dimensional view; and not in the three dimensional space. If the rotation axis R of the circular elongated element and the rotation axis $R_{ideal}$ of an ideal circular elongated element are parallel in the image, then the angle $\vartheta$ is 0°. Optionally the length(s) of the first end portion, optionally and the second end portion, is/are 0 cm to 10 cm, optionally 1 to 5 cm, optionally 5 cm; and/or the length of the first and/or second end portion is 0% to 50%, optionally 0 to 30%, optionally about 2.5% of the length of the cylindrical portion [mm/mm] of the circular elongated element, optionally about 2.5% of the length of the cylindrical portion [mm/mm] of the circular elongated element.

Herein, the centerline of a camera is a line extending orthogonal from the middle of the sensor of the camera and can be determined by an image acquired by the camera by the crossing of the two diagonals in the image, i.e. the centerline is orthogonal to both diagonals of the image.

Herein, the plane defined by the light emitting plane is perpendicular to the centerline of the light source extending orthogonal from the middle of the light source. For example, if the light source is a bulb or diode, the middle of a light source is the rotation axis of the light bulb or the diode. If several light bulbs diodes are used, for example a LED panel, the middle of the light source is the middle of these bulbs or diodes, for example the middle of the LED panel.

Herein, a relative movement is a movement, wherein the distance or angle, optionally the distance, of a specific object, e.g. the receiving unit, to another specific object, e.g. the circular elongated element, is changing over time. A rotation of a circular elongated element is not a relative movement, since neither the distance nor the angle to another specific object changes.

Unavoidable impurities herein are impurities, which may be contained in the educts, for example, the impurities are selected from a group consisting of Fe, Ti, Zn, Cu, Mn and Co. Optionally, the total amount of all unavoidable impurities is 5 wt.-% or less, optionally 2.5 wt.-% or less, optionally 1.0 wt.-% or less, optionally 0.5 wt.-% or less, optionally 0.1 wt.-% or less, optionally 0.01 wt.-% or less.

If not stated otherwise, herein the glass transition temperature Tg is measured by differential scanning calorimetry (DSC).

Herein the circumference of the first and second end of the circular elongated element is the circumference determined by the acquired images and is the outermost circumference visible in the images of the first end and the second end, respectively.

The circular elongated elements are optionally packed in a bundle. Herein, a bundle is a trading, loading or packaging unit for distribution of circular elongated elements, optionally empty circular elongated elements, i.e. circular elongated elements filled with a gas, e.g. air. For example, products usually, but not necessarily, of the same kind are combined as bundles when ordered together in retail or bundled in logistics. According to the invention, the circular elongated elements can be separated by a spacer, for example a plastic and/or paper sheet or fixed in a carrier plate, so that they are not in contact with each other during transport. Usually, but not necessarily, the bundle is at least partly covered by a plastic foil. An example of a bundle is the DENSOPACK® or the SCHOTT iQ® platform from SCHOTT AG. Optionally, several, e.g. 2 to 1000 bundles, optionally 20 to 200 bundles are stacked on a pallet. Thus, an aspect of the invention provides a pallet, comprising 2 to 1000 bundles, optionally 20 to 200 bundles, as described herein.

Herein, the center of cylindrical portion of the circular elongated element is the center±10% of the length of the cylindrical portion of the circular elongated element, optionally the center of the circular elongated element. If not stated otherwise, the outer diameter is determined at the center of the cylindrical portion of the circular elongated element.

The ellipse, the ideal half ellipse and the corrected half ellipse can be determined as follows:

The ideal half ellipse with regard to the first end can be calculated based on the outer diameter OD of the circular elongated element and the angle $\alpha$ between the centerline of the camera A and a plane perpendicular to the rotation axis $R_{ideal}$ of an ideal circular elongated element, i.e. a circular elongated element having no ovality and no curvature, according to the following equations (see also FIGS. 1 to 6):

$$\begin{pmatrix} E_{x(ideal)} \\ E_{y(ideal)} \\ E_{z(ideal)} \end{pmatrix} = \begin{pmatrix} 1 & 0 & 0 \\ 0 & \cos(90-\alpha) & -\sin(90-\alpha) \\ 0 & \sin(90-\alpha) & \cos(90-\alpha) \end{pmatrix} \begin{pmatrix} x \\ f(x) \\ 0 \end{pmatrix};$$

$$\text{wherein } f(x) = \sqrt{\left(\frac{OD}{2}\right)^2 - x^2}$$

With the same equation, the ideal half ellipse can be calculated for the second end by substituting $\alpha$ with $\beta$ in the above equation, wherein the angle $\beta$ is the angle between the centerline of the camera B and a plane perpendicular to the rotation axis $R_{ideal}$ of an ideal circular elongated element.

If the angle $\vartheta$ between the rotation axis of the circular elongated element and the rotation axis $R_{ideal}$ of an ideal circular elongated element differs from 0°, the ideal half ellipse can be corrected by the following equation to obtain the corrected half ellipse:

$$\begin{pmatrix} E_{x(corrected)} \\ E_{y(corrected)} \\ E_{z(corrected)} \end{pmatrix} = \begin{pmatrix} \cos(\vartheta) & -\sin(\vartheta) & 0 \\ \sin(\vartheta) & \cos(\vartheta) & 0 \\ 0 & 0 & 1 \end{pmatrix} \begin{pmatrix} E_{x(ideal)} \\ E_{y(ideal)} \\ E_{z(ideal)} \end{pmatrix};$$

With the above equations, especially $E_{x(corrected)}$ and $E_{y(corrected)}$ ($E_{z(corrected)}$ is not relevant for the determination of the axial run out), a corrected half ellipse can be calculated for each image. For the comparison with the image, the ideal or corrected half ellipse is overlaid with the image so that the point of intersection of the $E_{x(corrected)}$- and $E_{y(corrected)}$-axis of the corrected half ellipse is placed at the intersection of the major and minor axis of the ellipse determined in the image, i.e. the circumference of the first and/or second end of the circular elongated element. Further, to improve the accuracy of the determination of the axial run out only 90% [mm/mm] of the corrected half ellipse is used, i.e. 5% [mm/mm] on the left hand side and 5% [mm/mm] one the right hand side are cut off to obtain a part of the corrected half ellipse. If not stated otherwise, the angle $\vartheta$ is determined at the respective end portion of the circular elongated element. Thus, the rotation axis may be different in each image and/or for the first and second end. A person skilled in the art has no difficulties to determine the orientation of the end portion of a circular elongated element and compare the orientation with an orientation of an ideal circular elongated element to determine (see FIG. 6).

The axial run out ARO can be determined as follows:

By comparing an image, optionally the part of the circumference of the first and/or second end of the circular elongated element facing away from the camera when acquiring the image, obtained by the light receiving unit, i.e. the camera A or B, of the system described herein, with one of the above described at least a part of an ellipse, optionally the above described at least a part of an ideal half ellipse, optionally the above described at least a part of a corrected half ellipse, optionally 90% [mm/mm] of a corrected half ellipse, the difference D in millimeter [mm] between the at least a part of an ellipse and the part of the circumference of an end of the circular elongated element along (=parallel) the rotation axis of the ideal circular elongated element can be determined for each image. If not stated otherwise and especially for the determining of the parameter "ARO" (axial run out), as the at least a part of the ellipse the above described 90% [mm/mm] of a corrected half ellipse is used.

To obtain the axial run out, sufficient images, optionally images which at least partially overlay, e.g. 20 or more images, of the end of the circular elongated element are compared with the at least a part of an ellipse, optionally 90% [mm/mm] of the corrected half ellipse, which is individually determined for each image, so that the differences D for the entire circumference of the end of the circular elongated element are determined. The axial run out ARO is the maximum difference between the values determined in the comparisons of the images of the first end and second end, respectively, and can be, optionally is, obtained by the following equation:

$$ARO=(|D_\leftarrow|+|D_\rightarrow|)\div cost(\alpha);$$

wherein $D_\leftarrow$ is the maximum difference [mm] between the calculated (ideal or corrected) ellipse and the circumference determined in any image towards the center of the circular elongated element and $D_\rightarrow$ is the maximum difference [mm] between the calculated (ideal or corrected) ellipse and the circumference determined in any image away from the center of the circular elongated element. If not stated otherwise, 90% of the corrected half ellipse was used to determine the axial run out and the 90% of the corrected half ellipse is symmetrically identical with regard to a plane defined by the rotation axis of the circular elongated element and the respective camera and wherein the part of the circumference of the first and/or second end of the circular elongated element facing away from the camera when acquiring the image was used.

With the same equation, the axial run out can be calculated for the second end by substituting α with β in the above equation.

There are several ways how to design and further develop the teaching of the present invention in an advantageous way. The combination of two or more, for example 2, 3, 4 or 5 exemplary embodiments is provided. In summary, exemplary embodiments are the following items:

1. A method for determining the axial run out of a circular elongated element, comprising the steps, optionally in this order:
   providing a circular elongated element by a providing unit, the circular elongated element comprising:
   a first end,
   a cylindrical portion, defining:
      an outer diameter OD of the circular elongated element, and
      a rotation axis R of the circular elongated element, and
   a second end;
   illuminating the first end of the circular elongated element with a light source A of a light emitting unit;
   acquiring one or more image(s) of the first end of the circular elongated element with a camera A of a light receiving unit, wherein the angle α between the centerline of the camera A and a plane perpendicular to an rotation axis $R_{ideal}$ of an ideal circular elongated element is more than 0° and less than 90°;
determining at least a part of the circumference of the first end of the circular elongated element in each of the one or more image(s), optionally by a computer unit, to obtain a determined at least a part of the circumference of the first end of the circular elongated element; and
comparing the determined at least a part of the circumference of the first end of the circular elongated element with at least a part of an ellipse, optionally by a computer unit, to determine the axial run out of the first end of the circular elongated element.

2. A method according to any one of the preceding items, further comprising the steps, optionally in this order:
   illuminating the second end with a light source B of the light emitting unit; and
   acquiring one or more image(s) of the second end of the circular elongated element with a camera B of the light receiving unit, wherein the angle β between the centerline of the camera B and a plane perpendicular to the rotation axis $R_{ideal}$ of an ideal circular elongated element is more than 0° and less than 90°;
   determining at least a part of the circumference of the second end of the circular elongated element in each of the one or more image(s), optionally by a computer unit, to obtain a determined at least a part of the circumference of the second end of the circular elongated element; and
   comparing the determined at least a part of the circumference of the second end of the circular elongated element with at least a part of an ellipse, optionally by a computer unit, to determine the axial run out of the second end of the circular elongated element.

3. A method according to any one of the preceding items, further comprising the step:
   rotating the circular elongated element around the rotation axis R;
   wherein the one or more image(s) is/are acquired, while the circular elongated element is rotating around the rotation axis R.

4. A method according to any one of the preceding items, wherein the circular elongated element is moved relative to the light receiving unit;
   wherein the circular elongated element is rotated while the circular elongated element is moving relative to the light receiving unit; and
   wherein the one or more image(s) of the first and/or second end of the circular elongated element is/are acquired while the circular elongated element is moving relative to the light receiving unit and while the circular elongated element is rotating.

5. A method according to any one of the preceding items, further comprising the step:
   determining the angle ϑ between the rotation axis R of the circular elongated element and the rotation axis $R_{ideal}$ of an ideal circular elongated element; and
   wherein the at least a part of an ellipse is corrected based on the angle before the comparison, optionally as described in the description.

6. A method, optionally according to any one of the preceding items, further comprising the step:
   producing a pharmaceutical packaging, optionally a vial, cartridge, syringe or ampule, from the circular elongated element obtainable, obtained and/or measured by the a method according to any one of the preceding items.

7. A system for determining the axial run out of a circular elongated element, comprising:

a providing unit configured for providing a circular elongated element, the circular elongated element comprising:

a first end, a cylindrical portion, defining:

an outer diameter OD of the circular elongated element, and a rotation axis R of the circular elongated element, and a second end;

a light emitting unit comprising a light source A configured for illuminating the first end of the circular elongated element;

a light receiving unit comprising a camera A configured for acquiring one or more image(s) of the first end of the circular elongated element, wherein the angle $\alpha$ between the centerline of the camera A and a plane perpendicular to an rotation axis $R_{ideal}$ of an ideal circular elongated element is more than 0° and less than 90°; and a computer unit configured for performing the following steps, optionally in this order:

determining at least a part of the circumference of the first end of the circular elongated element in each of the one or more image(s) to obtain a determined at least a part of the circumference of the first end of the circular elongated element; and comparing the determined at least a part of the circumference of the first end of the circular elongated element with at least a part of an ellipse to determine the axial run out of the first end of the circular elongated element.

8. A system according to any one of the preceding items, wherein the light emitting unit comprises a light source B configured for illuminating the second end of the circular elongated element; and wherein the light receiving unit comprises a camera B configured for acquiring one or more image(s) of the second end of the circular elongated element, wherein the angle $\beta$ between the centerline of the camera B and a plane perpendicular to the rotation axis $R_{ideal}$ of an ideal circular elongated element is more than 0° and less than 90°; and wherein the computer unit is configured for performing the following further steps, optionally in this order:

determining at least a part of the circumference of the second end of the circular elongated element in each of the one or more image(s) to obtain a determined at least a part of the circumference of the second end of the circular elongated element; and comparing the determined at least a part of the circumference of the second end of the circular elongated element with at least a part of an ellipse to determine the axial run out of the second end of the circular elongated element.

9. A system according to any one of the preceding items, further comprising:

a rotation device for rotating the circular elongated element around the rotation axis R;

wherein the one or more image(s) is/are acquired, while the circular elongated element is rotating around the rotation axis R.

10. A system according to any one of the preceding items, wherein the computer unit is configured for performing the further step:

determining the angle $\vartheta$ between the rotation axis R of the circular elongated element and the rotation axis $R_{ideal}$ of an ideal circular elongated element; and wherein the at least a part of an ellipse is corrected based on the angle $\vartheta$ before the comparison, optionally as described in the description.

11. A method or system, according to any one of the preceding items, wherein the at least a part of the circumference of the first end, optionally and the second end, of the circular elongated element comprises, optionally is, the part of the circumference of the first and/or second end of the circular elongated element facing away from the camera A, optionally and B, when acquiring the image.

12. A method or system, according to any one of the preceding items, wherein the at least a part of an ellipse is at least a part of an half ellipse, optionally at least a part of an ideal half ellipse and/or at least a part of a corrected half ellipse, optionally at least a part of a corrected half ellipse, optionally 20 to 98% of a corrected half ellipse, optionally 50 to 95% of a corrected half ellipse, optionally 70 to 93% of a corrected half ellipse, optionally about 90% of a corrected half ellipse [mm/mm]; and optionally wherein the half ellipse, the ideal half ellipse and/or the corrected half ellipse is/are obtainable as described in the description.

13. A method or system, according to any one of the preceding items, wherein the camera A, optionally and B, optionally all cameras of the light receiving unit, is/are outside an area in-between a first plane and a second plane, wherein the first plane is a plane perpendicular to the rotation axis $R_{ideal}$ of an ideal circular elongated element and positioned at the first end of the ideal circular elongated element and the second plane is a plane perpendicular to the rotation axis $R_{ideal}$ of an ideal circular elongated element and positioned at the second end of an ideal circular elongated element; and/or wherein the camera A, optionally and B, optionally all cameras of the light receiving unit, is/are positioned that the camera A; optionally and B, respectively; optionally all cameras of the light receiving unit, receive light from the entire circumference of the first; optionally and the second end, respectively; of the circular elongated element which has not passed through any part of the circular elongated element; and/or wherein the angle $\Delta XYZ$ for camera A, optionally and B, optionally all cameras of the light receiving unit, is more than 90°, wherein Y is the end of the circular elongated element facing to the respective camera acquiring an image of the respective end and X is the opposite end of the circular elongated element and Z is the respective camera acquiring the image.

14. A method or system, according to any one of the preceding items, wherein $\alpha$, optionally and $\beta$, is/are 1° or more, optionally 2° or more, optionally 3° or more, optionally 4° or more, optionally 5° or more, optionally 8° or more, optionally 15° or more, optionally 25° or more, optionally 35° or more, optionally 45° or more.

15. A method or system, according to any one of the preceding items, wherein α, optionally and β, is/are 89° or less, optionally 45° or less, optionally 35° or less, optionally 25° or less, optionally 15° or less, optionally 10° or less, optionally 8° or less, optionally 7° or less, optionally 6° or less, optionally 5° or less, optionally 4° or less, optionally 3° or less, optionally 2° or less.

16. A method or system, according to any one of the preceding items,
   wherein α is β±10°, optionally is β±5°, optionally wherein α and β are the same.

17. A method or system, according to any one of the preceding items,
   wherein the light source A, optionally and light source B, define(s), optionally is/are, a light emitting plane A, optionally and a light emitting plane B;
   wherein the angle λ between the centerline of camera A; optionally and B, respectively; and a plane defined by the light emitting plane A; optionally and B, respectively; is 5° or more and 90° or less, optionally 45° or more and 90° or less, optionally 55° or more and 90° or less, optionally 65° or more and 90° or less, optionally 75° or more and 90° or less, optionally 85° or more and 90° or less.

18. A method or system, according to any one of the preceding items,
   wherein a lens, optionally a cylindrical lens, optionally a convex cylindrical lens, is positioned between the light source A and the circular elongated element; and/or
   wherein a lens, optionally a cylindrical lens, optionally a convex cylindrical lens, is positioned between the light source B and the circular elongated element; and/or
   wherein the light that leaves the circular elongated element is at least partially collimated light, divergent light or convergent light, optionally at least collimated light; and/or
   wherein the light that reaches the circular elongated element is at least partially collimated light, divergent light or convergent light, optionally at least partially convergent light.

19. A method or system, according to any one of the preceding items,
   wherein the light source A, optionally and B, optionally all light sources of the light emitting unit, is/are inside an area in-between a first plane and a second plane, wherein the first plane is a plane perpendicular to the rotation axis $R_{ideal}$ of an ideal circular elongated element and positioned at the first end of the ideal circular elongated element and the second plane is a plane perpendicular to the rotation axis $R_{ideal}$ of an ideal circular elongated element and positioned at the second end of the ideal circular elongated element; and/or
   wherein the angle ΔMNO for light source A, optionally and B, optionally all light sources of the light emitting unit, is less than 90°, wherein N is the end of the circular elongated element facing to the respective light source illuminating the respective end and M is the opposite end of the circular elongated element and O is the respective light source.

20. A method or system, according to any one of the preceding items,
   wherein at least 3, optionally at least 5, optionally at least 10, optionally at least 20, optionally at least 30 images of the first end, optionally and the second end, of the circular elongated element are acquired,
   optionally wherein sufficient images, optionally at least 3, optionally at least 5, optionally at least 10, optionally at least 20, optionally at least 30 images, are acquired by camera A; optionally and camera B, so that the parts of the circumference(s) of the first end, optionally and the second end, of the circular elongated element, facing away from the camera A; optionally and camera B, respectively; can be put together to obtain the entire circumference(s) of the first end, optionally and the second end, of the circular elongated element; optionally to determine the (entire) axial run out(s) of the first end, optionally and the second end, of the circular elongated element, optionally based on the parts of the circumference(s).

21. A method or system, according to any one of the preceding items,
   wherein the camera(s) A and/or B has 0.1 megapixel or more, optionally 0.2 megapixel or more, optionally 0.5 or more, optionally 1.0 megapixel or more, optionally 2 megapixel or more; and/or 500 megapixel or less, optionally 100 megapixel or less, optionally 10 megapixel or less, optionally 5 megapixel or less; and/or
   wherein the distance between the camera A and the camera B, respectively, and the first end of the circular elongated element and the second end of the circular elongated element, respectively, is 1 cm or more and 3000 cm or less, optionally 10 cm to 100 cm.

22. A method or system, according to any one of the preceding items,
   wherein the first and the second end of the circular elongated element are measured simultaneously or sequentially, optionally simultaneously.

23. A method or system, according to any one of the preceding items,
   wherein the time to measure the axial run out of the first end, optionally and the second end, of the circular elongated element is 1 minute or less, optionally 30 seconds or less, optionally 15 seconds or less, optionally 12 seconds or less, optionally 10 seconds or less, optionally 8 seconds or less, optionally 6 seconds or less, optionally 5 seconds or less, optionally 4 seconds or less, optionally 3 seconds or less, optionally 2 seconds or less, optionally 1 seconds or less, optionally 0.5 seconds or less; optionally 0.3 seconds or less.

24. A method or system, according to any one of the preceding items,
   wherein the rotation axis $R_{ideal}$ of an ideal circular elongated element is determined by the providing unit and an ideal circular elongated element, wherein the ideal circular elongated element is an circular elongated element having no curvature and no ovality, optionally wherein the outer diameter of the circular elongated element and the ideal circular elongated element is the same.

25. A method or system, according to any one of the preceding items,
   wherein the providing unit comprises:
   i) a transport device, optionally comprising a transport plane and a feed plane, and
   ii) a rotation device, optionally comprising a rotation plane,
      optionally wherein the rotation plane and/or, optionally and, the transport plane is/are even; and/or
      optionally wherein the rotation plane is parallel to the transport plane,
   wherein the transport device is configured for moving the circular elongated element relative to the light receiving unit;
   wherein the rotation device and the transport device are configured for rotating the circular elongated element while the circular elongated element is moving relative to the light receiving unit; and wherein the light receiving unit is configured for acquiring one or more image(s) of the first and/or second end of the circular elongated element while the circular elongated element is moving relative to the light receiving unit and while the circular elongated element is rotating.

26. A bundle comprising 5 or more circular elongated elements, each circular elongated element comprising:
a first end,
a cylindrical portion, defining:
an outer diameter OD of the circular elongated element, and
a rotation axis R of the circular elongated element, and
a second end;
wherein the first and/or, optionally and, the second end of each circular elongated element fulfill(s) the following equation:

$$ARO \leq A$$

wherein value A is 1.3 mm;
wherein ARO is/are the axial run out(s) in mm of the first end and/or second end of the circular elongated element.

27. A bundle comprising 5 or more circular elongated elements, optionally according to any one of the preceding items, each circular elongated element comprising:
a first end,
a cylindrical portion, defining:
an outer diameter OD of the circular elongated element, and
a rotation axis R of the circular elongated element, and
a second end;
wherein the first and/or, optionally and, the second end of each circular elongated elements fulfill(s) the following equation:

$$ARO/OD \leq B$$

wherein value B [mm/mm] is 0.1;
wherein ARO is/are the axial run out(s) in mm of the first end and/or second end of the circular elongated element, and
wherein OD is the outer diameter in mm of the circular elongated element.

28. A bundle according to any one of the preceding items, wherein the first and/or, optionally and, the second end of each circular elongated element fulfill(s) the following equation(s):

$$C \leq ARO; \text{ and/or}$$

$$D \leq ARO/OD$$

wherein value C is 1 µm, optionally 10 µm, optionally 500 µm, optionally 1000 µm; and/or
wherein value D is $1*10^{-3}$, optionally $5*10^{-3}$, optionally $1*10^{-2}$, optionally $5*10^{-3}$;
wherein ARO is/are the axial run out(s) in mm of the first end and/or second end of the circular elongated element, and
wherein OD is the outer diameter in mm of the circular elongated element.

29. A bundle according to any one of the preceding items, wherein A is 1.2 mm, optionally 1.1 mm, optionally 1.0 mm, optionally 0.9 mm, optionally 0.8 mm, optionally 0.7 mm, optionally 0.6 mm, optionally 0.5 mm, optionally 0.4 mm, optionally 0.35 mm, optionally 0.3 mm, optionally 0.25 mm, optionally 0.2 mm, optionally 0.15 mm, optionally 0.1 mm, optionally 0.05 mm, optionally 0.03 mm, optionally 0.01 mm.

30. A bundle according to any one of the preceding items, wherein B is 0.09, optionally 0.08, optionally 0.07, optionally 0.06, optionally 0.05, optionally 0.04, optionally 0.035, optionally 0.03, optionally 0.025, optionally 0.02, optionally 0.015, optionally 0.01, optionally 0.005, optionally 0.003, optionally 0.001.

31. A bundle comprising 5 or more circular elongated elements, wherein the first end is an open end or closed end, optionally an open end; and/or wherein the second end is an open end or closed end, optionally an open end.

32. A bundle according to any one of the preceding items, wherein the value(s) A, B, C and/or D was/were determined contactless; and/or wherein the value(s) A, B, C and/or D was/were obtainable and/or obtained by the a method according to any one of the preceding items and/or by using the system according to any one of the preceding items; and/or wherein the measurement of the value(s) A, B, C and/or D was/were performed contactless, i.e. that the end(s) of the circular elongated element(s) was/were not in contact with any material (except gas/air) during the measurement of the values A, B, C and/or D; and/or wherein during the measurements of the value(s) A, B, C and/or D, there was no contact between the end(s) and/or end portion(s) of the circular elongated element(s) and any material, except gas and/or air; and/or wherein during the measurement of the value(s) A, B, C and/or D at least the terminal 1 mm portion(s) of the circular elongated element(s) was/were surrounded by air; and/or wherein during the measurement of the value(s) A, B, C and/or D, there was no contact between any unit involved in the measurement and the first and/or second end portion(s) of the circular elongated element(s).

33. A use of at least one circular elongated element of a bundle of any one of the preceding items for the production of a pharmaceutical packaging, optionally wherein the pharmaceutical packaging is selected from the group consisting of vial, cartridge, syringe or ampule; and/or optionally wherein the circular elongated element is a glass tube.

34. A method, system, bundle and/or use, according to any one of the preceding items, wherein the circular elongated element is a tube or rod, optionally a tube.

35. A method, system, bundle and/or use, according to any one of the preceding items, wherein the bundle comprises, optionally exhibits, 5 or more, optionally 10 or more, optionally 20 or more, optionally 25 or more, optionally 35 or more, optionally 50 or more, optionally 60 or more, optionally 80 or more, optionally 100 or more, optionally 200 or more, circular elongated elements; and/or, optionally and;

1000 or less, optionally 800 or less, optionally 700 or less, optionally 600 or less, optionally 500 or less, optionally 400 or less, optionally 300 or less, optionally 200 or less, optionally 150 or less, optionally 100 or less, optionally 60 or less, circular elongated elements.

36. A method, system, bundle and/or use, according to any one of the preceding items, wherein the circular elongated element is made of glass, optionally wherein the glass is a borosilicate glass, an aluminosilicate glass, a lithium-aluminosilicate (LAS) glass, optionally a borosilicate glass.

37. A method, system, bundle and/or use, according to any one of the preceding items, wherein the circular elongated element is made of glass, wherein the composition of the glass comprises, in mass-%:

Si: 30 to 98%, optionally 50 to 90%, optionally 70.0 to 74.0%; and/or $B_2O_3$: 0 to 30%, optionally 3 to 20%, optionally 7.0 to 16.0%; and/or $Al_2O_3$: 0 to 30%, optionally 1 to 15%, optionally 3.0 to 6.5%; and/or $X_2O$: 0 to 30%, optionally 1 to 15%, optionally 2.0 to 7.2%, wherein X is selected from Na, K, Li, optionally X is Na and/or K; and/or YO: 0 to 30%, optionally 0.1 to 5%, optionally 0.5 to 1.0%, wherein Y is selected from Ca, Mg, Ba, optionally Y is Ca and/or Mg.

38. A method, system, bundle and/or use, according to any one of the preceding items, wherein the circular elongated element is made of glass, wherein the composition of the glass consist of, in mass-%:

Si: 30 to 98%, optionally 50 to 90%, optionally 70.0 to 74.0%;

$B_2O_3$: 0 to 30%, optionally 3 to 20%, optionally 7.0 to 16.0%;

$Al_2O_3$: 0 to 30%, optionally 1 to 15%, optionally 3.0 to 6.5%;

$X_2O$: 0 to 30%, optionally 1 to 15%, optionally 2.0 to 7.2%, wherein X is selected from Na, K, Li, optionally X is Na and/or K;

YO: 0 to 30%, optionally 0.1 to 5%, optionally 0.5 to 1.0%, wherein Y is selected from Ca, Mg, Ba, optionally Y is Ca and/or Mg; and unavoidable impurities.

39. A method, system, bundle and/or use, according to any one of the preceding items, wherein the circular elongated element is made of glass, wherein the composition of the glass comprises, in mass-%:

Si: 20 to 98%, optionally 40 to 75%, optionally 50 to 65%; and/or $B_2O_3$: 0 to 30%, optionally 1 to 15%, optionally 3 to 9%; and/or $Al_2O_3$: 0 to 30%, optionally 10 to 20%, optionally 13 to 18; and/or $X_2O$: 0 to 30%, optionally 0 to 5%, optionally 0 to 3%, wherein X is selected from Na, K, Li, optionally X is Na and/or K; and/or YO: 0 to 50%, optionally 0.1 to 40%, optionally 10 to 35, wherein Y is selected from Ca, Mg, Ba, optionally Y is Ca and/or Mg.

40. A method, system, bundle and/or use, according to any one of the preceding items, wherein the circular elongated element is made of glass, wherein the composition of the glass consists of, in mass-%:

Si: 20 to 98%, optionally 40 to 75%, optionally 50 to 65%;

$B_2O_3$: 0 to 30%, optionally 1 to 15%, optionally 3 to 9%;

$Al_2O_3$: 0 to 30%, optionally 10 to 20%, optionally 13 to 18;

$X_2O$: 0 to 30%, optionally 0 to 5%, optionally 0 to 3%, wherein X is selected from Na, K, Li, optionally X is Na and/or K;

YO: 0 to 50%, optionally 0.1 to 40%, optionally 10 to 35, wherein Y is selected from Ca, Mg, Ba, optionally Y is Ca and/or Mg; and unavoidable impurities.

41. A method, system, bundle and/or use, according to any one of the preceding items, wherein the outer diameter OD, optionally measured at the center of the cylindrical portion of the circular elongated element, is 2 mm or more and 100 mm or less, optionally 4 mm or more and 50 mm or less, optionally 6 mm or more and 35 mm or less, optionally 8 mm or more and 25 mm or less, optionally 10 mm or more and 20 mm or less.

42. A method, system, bundle and/or use, according to any one of the preceding items, wherein the length of the cylindrical portion is 1 cm or more and 1000 cm or less, optionally 20 cm or more and 400 cm or less, optionally 60 cm or more and 300 cm or less, optionally 100 cm or more and 200 cm or less, optionally 120 cm or more and 180 cm or less.

43. A method, system, bundle and/or use, according to any one of the preceding items, wherein the circular elongated element is obtainable by the following steps:

forming a continuous circular elongated element by the Danner or the Vello process, cutting the continuous circular elongated element to length to obtain a cut circular elongated element, comprising a first end, a cylindrical portion and a second end; and forming the first and/or second end by:

annealing a ring-shaped area, optionally having a height of 2 mm or less, optionally 0.4 mm to 1.5 mm, near the first and/or second end of the cut circular elongated element, optionally with a burner, scratching at least a part of the ring-shaped area(s) to induce a crack, suddenly cooling the ring-shaped area(s), optionally with water, to obtain a clean cut circular elongated element, comprising a first end, a cylindrical portion and a second end, reheating and forming the first and/or second end of the clean cut circular elongated element to obtain the circular elongated element having an open first and/or second end;

and/or annealing a ring-shaped area near the first and/or second end of the cut circular elongated element above Tg, optionally with a burner, turning off and forming the first and/or second end of the cut circular elongated element, optionally and shaping the first and/or second end of the cut circular elongated element by an air stream, to obtain the circular elongated element having a closed first and/or second end.

44. A method, system, bundle and/or use, according to any one of the preceding items, wherein the cylindrical elongated element comprises:

a first end comprising a/the circumference of the first end, and optionally a second end comprising a/the circumference of the second end, and a cylindrical portion, comprising:
   a first end portion comprising the first end, and
   a center of the cylindrical portion; and
   optionally a second end portion comprising the second
      end, and
   optionally wherein the outer diameter OD is defined by
      the center of the cylindrical portion; and/or, option-
      ally and,
   optionally wherein the length(s) of the first end portion,
      optionally and the second end portion, is/are 0 cm to
      10 cm, optionally 1 to 5 cm, optionally 5 cm; and/or
      wherein the length of the first and/or second end
      portion is 0% to 50%, optionally 0 to 30%, option-
      ally about 2.5% of the length of the cylindrical
      portion [mm/mm] of the circular elongated element,
      optionally wherein the length(s) of the first end
      portion, optionally and the second end portion is
      about 2.5% of the length of the cylindrical portion
      [mm/mm] of the circular elongated element; and/or,
      optionally and,
   optionally wherein the first end portion defines the
      rotation axis R of the rotation axis R of the circular
      elongated element for the measurement of the axial
      run out of the first end; and/or, optionally and,
   optionally wherein the second end portion defines the
      rotation axis R of the rotation axis R of the circular
      elongated element for the measurement of the axial
      run out of the second end.

45. A pharmaceutical packaging producible from one or
more circular elongated element of the bundle according to
any one of the preceding items, optionally wherein the
pharmaceutical packaging is selected from the group con-
sisting of vial, cartridge, syringe or ampule; and/or option-
ally wherein the circular elongated element is a glass tube.

Figure 2:
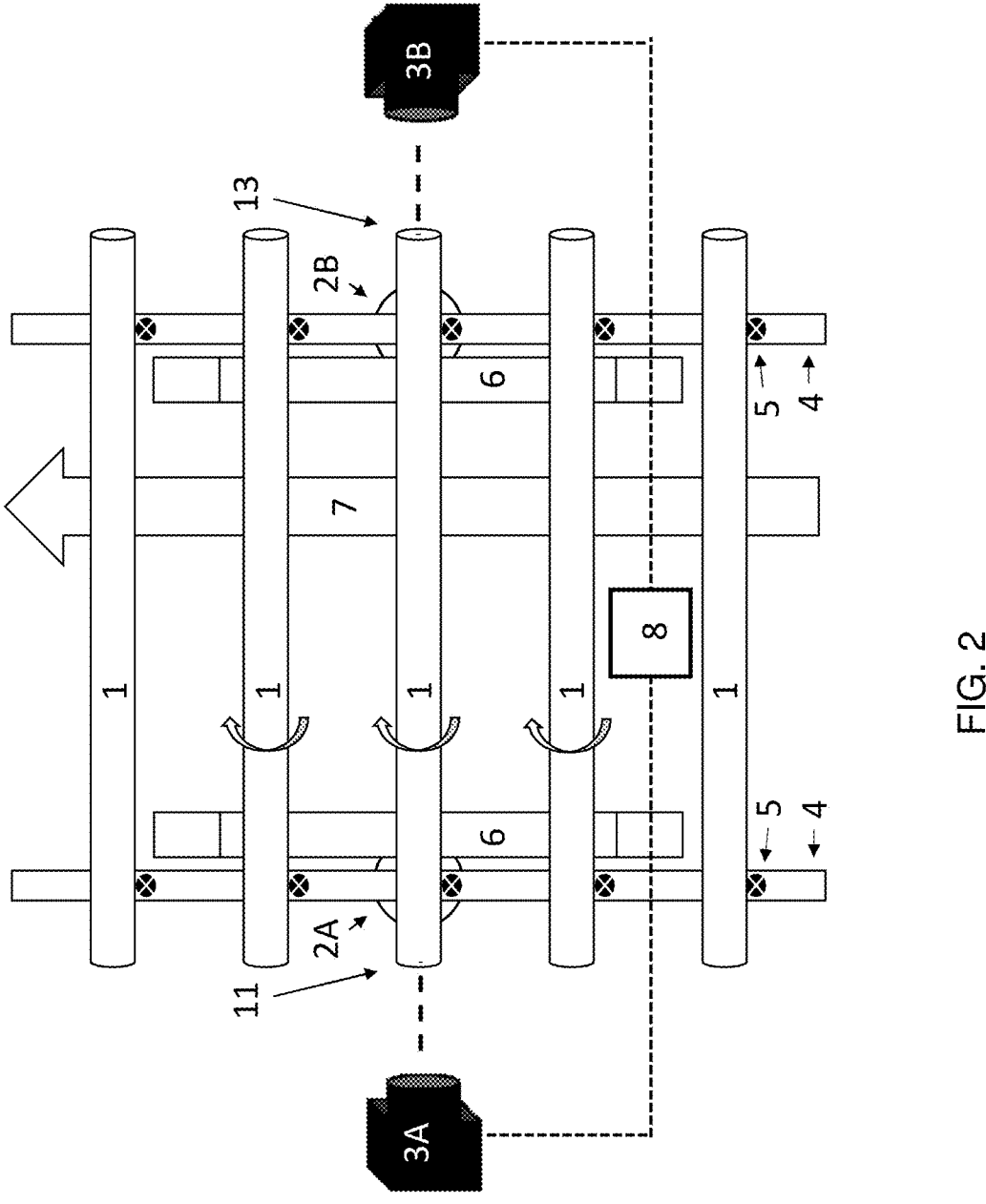
FIG. 2 is a schematic top view of a system provided according to an embodiment.
Figure 3:
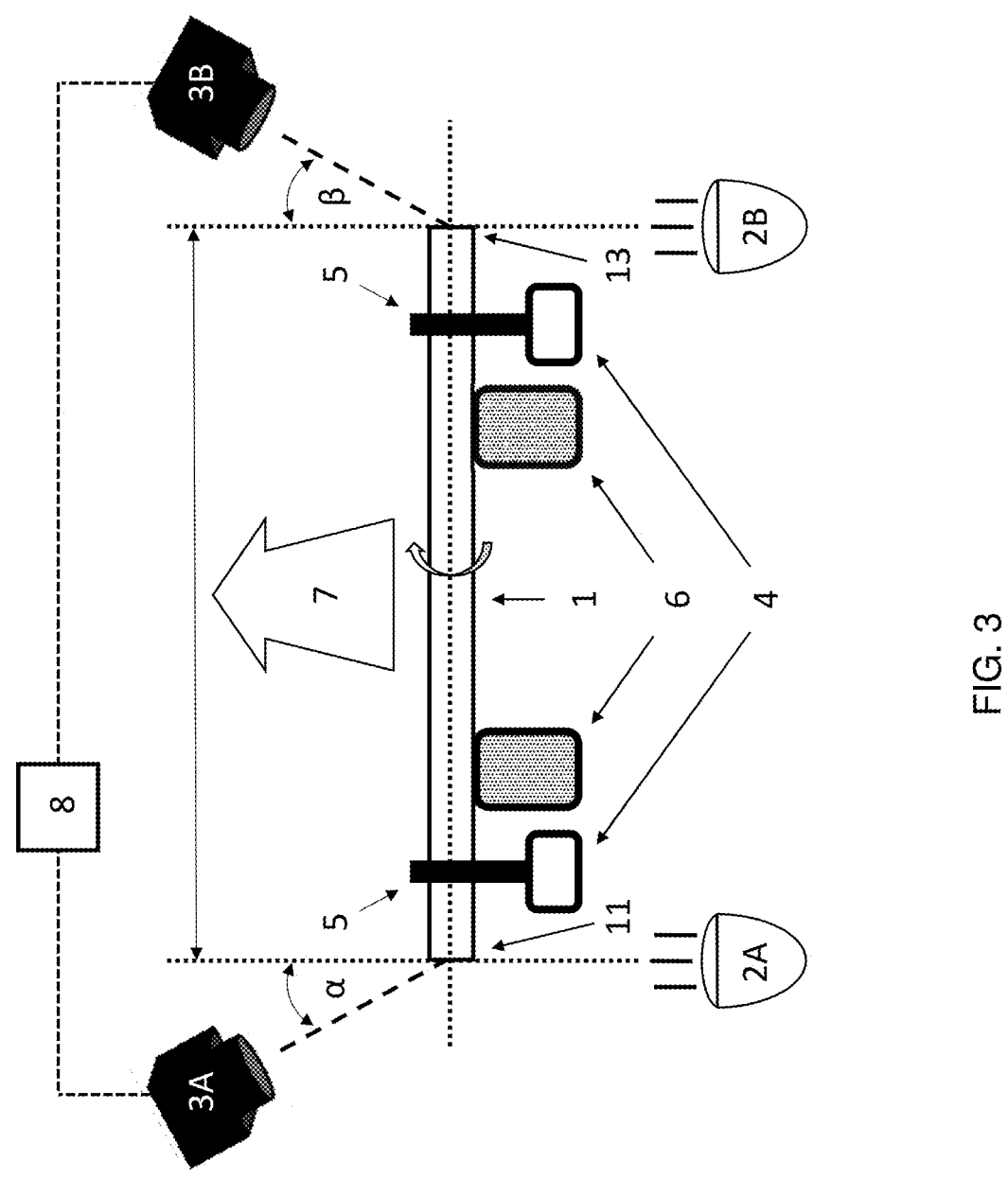
FIG. 3 is a schematic front view of a system provided according to an embodiment.

Referring now to the drawings, FIGS. 1 to 3 show
schematic views of a system provided according to an
embodiment. The circular elongated elements 1 arrive with
the aid of a providing unit at the system for determining the
axial run out of the first and/or second end of a circular
elongated element 11/13 and move along the direction of
movement 7 through the system. The providing unit com-
prises a transport plane 4, a feed plane 5, and a rotation plane
6. In the beginning, the circular elongated element 1 is only
in contact with the transport plane 4 and the feed plane 5, i.e.
conveyor belt. Then the circular elongated element 1 reaches
the rotation plane 6 which is elevated compared to the
transport plane 4 so that the circular elongated element 1 is
only in contact with the rotation plane 6 and the feed plane
5 and thus starts to rotate. The first and the second end of the
circular elongated element 11/13 are illuminated with the
light sources 2A and 2B and while the circular elongated
element 1 is rotating, the cameras 3A and 3B of the light
receiving unit acquire simultaneously images of the first end
and the second end of the circular elongated element 11/13,
wherein the angles between the centerline of the camera A
and B, respectively, and a plane perpendicular to the rotation
axis $R_{ideal}$ of an ideal circular elongated element are 5°
(angles $\alpha$ and $\beta$). The images are transferred to the computer
unit 8, which determines at least a part of the circumference
of the first and the second end of the circular elongated
element 14 in each of the images to obtain determined at
least a part of the circumferences 14. In addition, the
computer unit 8 determines the angle between the rotation
axis R of the circular elongated element 122 and the rotation
axis $R_{ideal}$ of an ideal circular elongated element 123 (angle
$\vartheta$) and calculates 90% of a corrected half ellipse 143 of each
image. Then the computer unit 8 compares the determined at least a part of the circumferences 14 with the 90% of a
corrected half ellipse 143 to determine the axial run out of
the first end 11 and second end 13, respectively, of the
circular elongated element 1.

Figure 4:
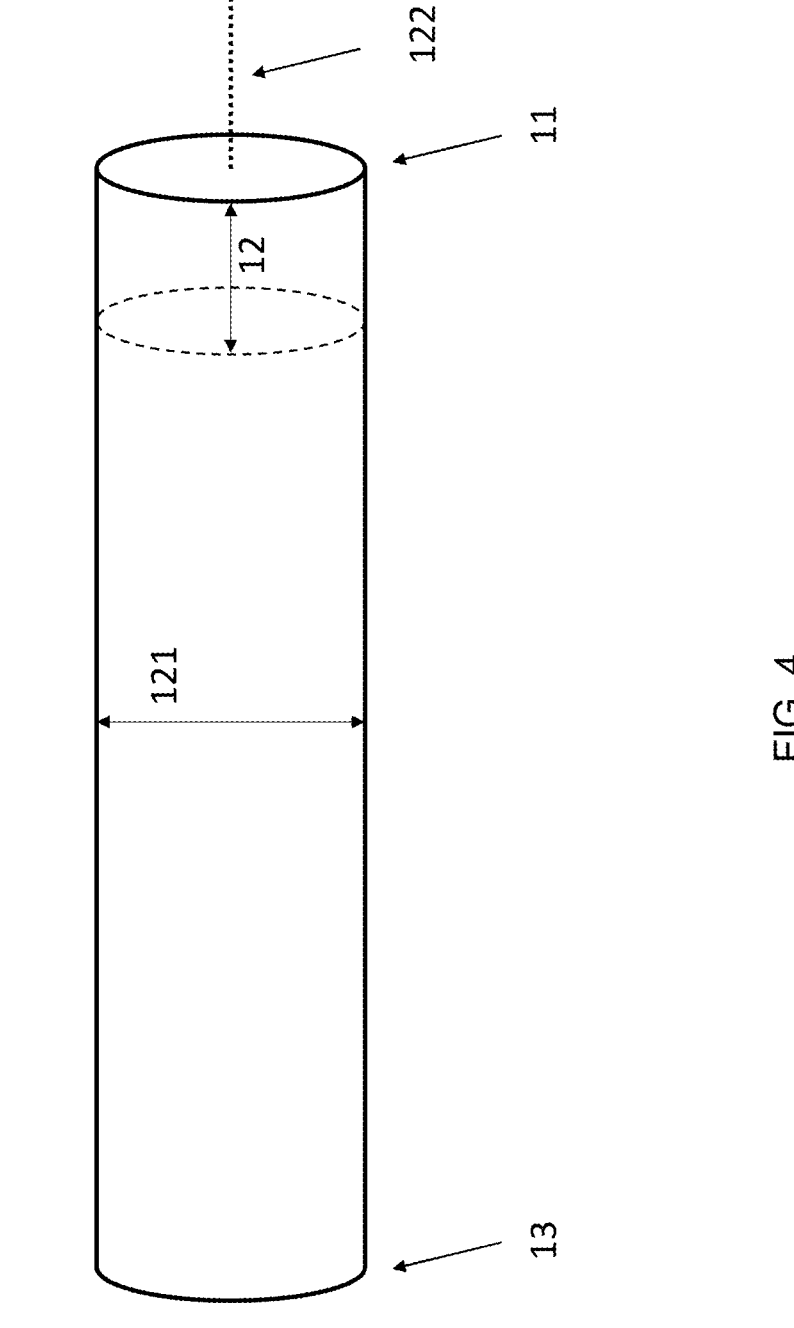
FIG. 4 is a schematic depiction of a circular elongated element.

FIG. 4 shows a schematic view of a circular elongated
element 1 comprising a first end 11 and a second end 13 and
a cylindrical portion 12 defining the outer diameter 121. The
cylindrical portion 12 comprises a cylindrical end portion
with regard to the first end 12 and with regard to the second
end (not shown). The rotation axis 122 is determined for
each end based on the cylindrical end portion of the first end
12 and second end (not shown), respectively. Thus, the
rotation axis 122 may be different for the first end 11 and the
second end 13, for example, if the cylindrical portion 12 has
a curvature due to production fluctuations.

Figure 5:
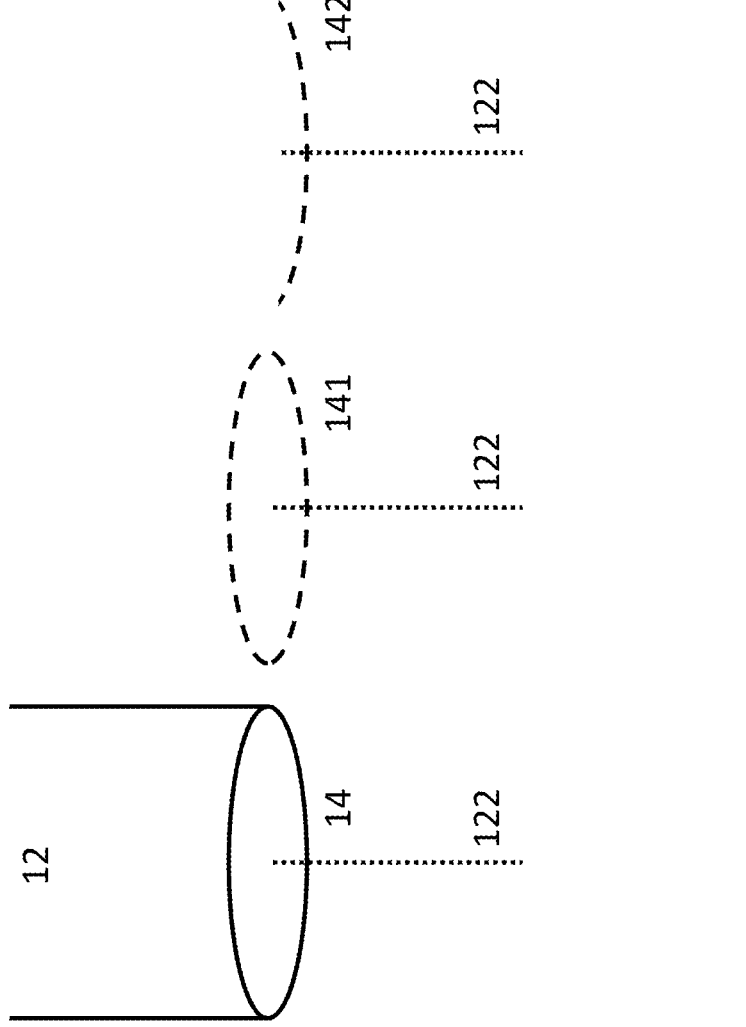
FIG. 5: is a schematic depiction of the circumference of an end of the circular elongated element, an ideal ellipse and a part of the ideal ellipse.
Figure 6:
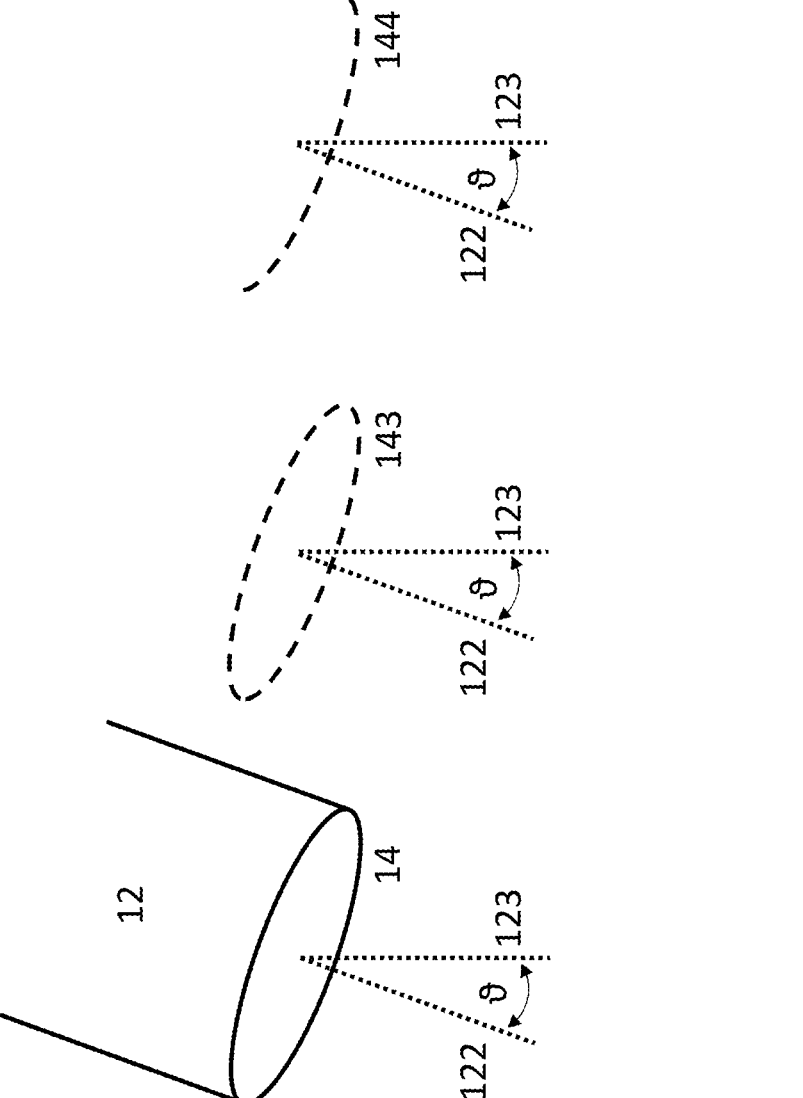
FIG. 6 is a schematic depiction of the circumference of an end of the circular elongated element, corrected ellipse and a part of the corrected ellipse.

FIGS. 5 and 6 show the schematic views of the circum-
ference of an end of the circular elongated element 14, ideal
ellipse 141, part of the ideal ellipse 142, the corrected ellipse
143 and the part of the corrected ellipse 144. The difference
between FIGS. 5 and 6 is that in FIG. 5 the angle $\vartheta$ between
the rotation axis R of the circular elongated element 122 and
the rotation axis $R_{ideal}$ of an ideal circular elongated element
123 is 0°, wherein the angle $\vartheta$ in FIG. 6 is different from 0°.
As can be seen by comparing the schematic views, the
comparison of (a part of) the circumference 14 wherein the
angle is different from 0° and (a part of) a corrected ellipse
143/144 leads to more accurate result compared to a com-
parison of (a part of) a circumference 14 wherein the angle
$\vartheta$ is different from 0° and (a part of) an ideal ellipse 141/142.

While this invention has been described with respect to at
least one embodiment, the present invention can be further
modified within the spirit and scope of this disclosure. This
application is therefore intended to cover any variations,
uses, or adaptations of the invention using its general
principles. Further, this application is intended to cover such
departures from the present disclosure as come within
known or customary practice in the art to which this inven-
tion pertains and which fall within the limits of the appended
claims.

REFERENCE LIST 1 circular elongated element
11 first end of the circular elongated element
12 length of the first end portion of the circular elongated
   element
121 outer diameter OD of the circular elongated element
122 rotation axis R of the circular elongated element
123 rotation axis $R_{ideal}$ of an ideal circular elongated
   element
13 second end of the circular elongated element
14 circumference of an end of the circular elongated
   element
141 ideal ellipse
142 part of the ideal ellipse
143 corrected ellipse
144 part of the corrected ellipse
2A light source A
2B light source B
3A camera A
3B camera B
4 transport plane
5 feed plane
6 rotation plane
7 direction of movement
8 computer unit α angle between the centerline of the camera A and a plane perpendicular to the rotation axis $R_{ideal}$ of an ideal circular elongated element β angle between the centerline of the camera B and a plane perpendicular to the rotation axis $R_{ideal}$ of an ideal circular elongated element ϑ angle between the rotation axis R of the circular elongated element and the rotation axis $R_{ideal}$ of an ideal circular elongated element

What is claimed is:

1. A bundle, comprising:

five or more circular elongated elements, each circular elongated element being a tube and comprising:

a first end;

a cylindrical portion defining an outer diameter of the circular elongated element and a rotation axis of the circular elongated element; and a second end;

wherein the first end and/or the second end of each circular elongated element fulfills the following equation: ARO≤A, wherein value A is 1.3 mm and ARO is an axial run out in mm of the first end and/or the second end of the respective circular elongated element, wherein the first end and/or the second end of each circular elongated element is an open end.

2. The bundle of claim 1, wherein the first end and/or the second end of each circular elongated element fulfills at least one of the following equations:

$C \leq ARO$; or $D \leq ARO/OD$;

wherein value C is 1 μm and value D is 1*10-3;

wherein OD is the outer diameter in mm of the respective circular elongated element.

3. The bundle of claim 2, wherein the value C is 1000 μm.

4. The bundle of claim 2, wherein the value D is 5*10-3.

5. The bundle of claim 1, wherein the value A is 1.2 mm.

6. The bundle of claim 5, wherein the value A is 0.7 mm.

7. The bundle of claim 1, wherein the first end and/or the second end of each circular elongated elements fulfills the following equation: ARO/OD≤B, wherein value B in mm/mm is 0.1 and OD is the outer diameter in mm of the respective circular elongated element.

8. The bundle of claim 7, wherein the value B is 0.09.

9. The bundle of claim 1, wherein at least one of the following conditions is satisfied:

the value A was determined contactless;

measurement of the value A was performed contactless so that the first end and the second end of the respective circular elongated element were not in contact with any material except a gas and/or air during the measurement of the value A;

during measurement of the value A there was no contact between the first end, the second end, and/or end portions of the respective circular elongated element and any material except gas and/or air;

during measurement of the value A at least a terminal 1 mm portion of the respective circular elongated element was surrounded by air; or during measurement of the value A there was no contact between any unit and/or device involved in the measurement and the first end and/or the second end of the respective circular elongated element.

10. The bundle of claim 1, wherein each of the circular elongated elements is made of glass.

11. A bundle, comprising:

five or more circular elongated elements, each circular elongated element being a tube and comprising:

a first end;

a cylindrical portion defining an outer diameter of the circular elongated element and a rotation axis of the circular elongated element; and a second end;

wherein the first end and/or the second end of each circular elongated element fulfills the following equation: ARO/OD≤B, wherein value B in mm/mm is 0.1, ARO is an axial run out in mm of the first end and/or the second end of the respective circular elongated element, and OD is the outer diameter in mm of the respective circular elongated element, wherein the first end and/or the second end of each circular elongated element is an open end.

12. The bundle of claim 11, wherein the first end and/or the second end of each circular elongated element fulfills at least one of the following equations:

$C \leq ARO$; or $D \leq ARO/OD$;

wherein value C is 1 μm and value D is 1*10-3.

13. The bundle of claim 12, wherein the value C is 1000 μm.

14. The bundle of claim 12, wherein the value D is 5*10-3.

15. The bundle of claim 11, wherein the value B is 0.09.

16. The bundle of claim 15, wherein the value B is 0.04.

17. The bundle of claim 11, wherein the first end and/or the second end of each circular elongated element fulfills the following equation: ARO≤A, wherein the value A is 1.2 mm.

18. The bundle of claim 11, wherein at least one of the following conditions is satisfied:

the value B was determined contactless;

measurement of the value B was performed contactless so that the first end and the second end of the respective circular elongated element were not in contact with any material except a gas and/or air during the measurement of the value B;

during measurement of the value B there was no contact between the first end, the second end, and/or end portions of the respective circular elongated element and any material except gas and/or air;

during measurement of the value B at least a terminal 1 mm portion of the respective circular elongated element was surrounded by air; or during measurement of the value B there was no contact between any unit and/or device involved in the measurement and the first end and/or the second end of the respective circular elongated element.

19. The bundle of claim 11, wherein each of the circular elongated elements is made of glass.

* * * * *